United States Patent
Wilson et al.

(10) Patent No.: US 11,691,218 B2
(45) Date of Patent: Jul. 4, 2023

(54) ADDITIVE-MANUFACTURING METHODS

(71) Applicant: THE BOEING COMPANY, Chicago, IL (US)

(72) Inventors: Paul Nathaniel Wilson, St. Charles, MO (US); Fatmata Haja Barrie, Knoxville, TN (US)

(73) Assignee: The Boeing Company, Arlington, VA (US)

( * ) Notice: Subject to any disclaimer, the term of this patent is extended or adjusted under 35 U.S.C. 154(b) by 209 days.

(21) Appl. No.: 16/364,818

(22) Filed: Mar. 26, 2019

(65) Prior Publication Data

US 2020/0306883 A1 Oct. 1, 2020

(51) Int. Cl.
*B23K 26/082* (2014.01)
*B33Y 10/00* (2015.01)
*B33Y 30/00* (2015.01)
*B23K 26/342* (2014.01)
*B23K 26/06* (2014.01)
(Continued)

(52) U.S. Cl.
CPC ............ *B23K 26/082* (2015.10); *B22F 10/28* (2021.01); *B22F 10/36* (2021.01); *B22F 10/362* (2021.01); *B22F 10/366* (2021.01); *B23K 26/0626* (2013.01); *B23K 26/0665* (2013.01); *B23K 26/073* (2013.01); *B23K 26/08* (2013.01); *B23K 26/342* (2015.10); *B33Y 10/00* (2014.12); *B33Y 30/00* (2014.12); *B33Y 40/10* (2020.01); *B33Y 50/02* (2014.12); *B33Y 70/00* (2014.12); *Y02P 10/25* (2015.11)

(58) Field of Classification Search
CPC ............. B23K 26/342; B23K 26/0626; B23K 26/073; B23K 26/08; B23K 26/082; B33Y 10/00; B33Y 30/00
See application file for complete search history.

(56) References Cited

U.S. PATENT DOCUMENTS 10,144,176 B1 * 12/2018 Buller ................... B29C 64/245
2015/0198052 A1 * 7/2015 Pavlov .................... F23R 3/002
416/241 B (Continued)

OTHER PUBLICATIONS

Read et al., MM 2015, 'Selective laser melting of AlSi10Mg alloy: Process optimisation and mechanical properties development', Materials & Design, vol. 65, pp. 417-424 (Year: 2015).*

(Continued)

*Primary Examiner* — Nathaniel E Wiehe
*Assistant Examiner* — Fahmida Ferdousi
(74) *Attorney, Agent, or Firm* — Patterson + Sherdan, LLP

(57) ABSTRACT

The present disclosure provides methods of forming products using one or more lasers. In at least one aspect, a method for powder bed additive manufacturing includes defining a uniform pitch raster path for a laser traveling at a predetermined rate of travel. The raster path alternates back and forth within a strip width of less than 0.5 mm such that the laser's power density level is at least 80 percent of maximum power and the predetermined rate of travel yields a travel speed in the scan width direction of not less than 1,000 mm/s. The method includes depositing a layer of powder onto a substrate and causing the laser to solidify a quantity of the powder according to the defined raster path and the laser power setting.

39 Claims, 10 Drawing Sheets

(51) Int. Cl.
| | |
|---|---|
| B23K 26/073 | (2006.01) |
| B23K 26/08 | (2014.01) |
| B33Y 70/00 | (2020.01) |
| B33Y 50/02 | (2015.01) |
| B33Y 40/10 | (2020.01) |
| B22F 10/28 | (2021.01) |
| B22F 10/36 | (2021.01) |
| B22F 10/362 | (2021.01) |
| B22F 10/366 | (2021.01) |

(56) References Cited

U.S. PATENT DOCUMENTS

| | | | |
|---|---|---|---|
| 2018/0001548 A1 | 1/2018 | Dietrich et al. | |
| 2018/0185891 A1 | 7/2018 | Barclay | |
| 2018/0250775 A1 | 9/2018 | Spink et al. | |
| 2018/0290241 A1* | 10/2018 | McClelland | B22F 10/20 |
| 2018/0370114 A1* | 12/2018 | Hopkins | C08L 83/00 |
| 2019/0039183 A1* | 2/2019 | Morton | C22C 1/0416 |
| 2019/0084222 A1* | 3/2019 | Jones | B29C 64/386 |
| 2019/0275612 A1* | 9/2019 | Yap | B22F 10/30 |

OTHER PUBLICATIONS

Mercelis, (2006), "Residual stresses in selective laser sintering and selective laser melting", Rapid Prototyping Journal, vol. 12 No. 5, pp. 254-265 (Year: 2006).*

Carter et al., "The influence of the laser scan strategy on grain structure and cracking behaviour in SLM powder-bed fabricated nickel super alloy", Journal of alloys and compounds, pp. 338-347, 2014 (Year: 2014).*

Li et al., "The influence of scan length on fabricating thin-walled components in selective laser melting", International Journal of Machine Tools and Manufacture, Nov. 2017 (Year: 2017).*

Meier et al., "Thermophysical Phenomena in metal additive manufacturing by selective laser melting: fundamentals, modeling, simulation and experimentation", arxiv.org. , Sep. 2017 (Year: 2017).*

Aboulkhair et al., "Reducing porosity in AlSi10Mg parts processed by selective laser melting,"Additive manufacturing, 2014 (Year: 2014).*

Extended European Search Report for Application No. 20164451.5-1103 dated Jan. 9, 2020.

Daniel Koutny et al.,"Processing of High Strength Al—Cu alloy Using 400W Selective laser Melting-Initial Study," Laswers in Manufacturing Conference, Jan. 1, 2015.

Qi Ting et al., "Selective Laser Melting of Al7050 Powder: Melting Mode Transition and Comparison of the Characteristics Between the Keyhole and Conduction Mode," Materials and Design, vol. 135, Sep. 8, 2017.

Buchbinder D. et al., "High Power Selective Laser Melting (HP SLM) of Aluminum Parts," Physics Procedia, vol. 12, Apr. 15, 2011.

Syed Z. Uddin et al., "Processing and Characterization of Crack-Free Aluminum 6061 using high-temperature heating in laser powder bed fusion additivie manufacturing," Additive Manufacturing, vol. 22, Aug. 1, 2018, pp. 405-415.

Jinliang Zhang et al: 11A review of selective laser melting of aluminum alloys: Processing, microstructure, property and developing trends 11 Journal of Materials Science & Technology, vol. 35, No. 2, Sep. 12, 2018 (Sep. 12, 2018), pp. 270-284.

Christoph Meier et al: 11 Thermophysical Phenomena in Metal Additive Manufacturing by Selective Laser Melting: Fundamentals, Modeling, Simulation and Experimentation 11 arxiv.org, Cornell University Library, 201 Olin Library Cornell University Ithaca, NY 14853, Sep. 4, 2017.

Zavala-Arredondo Miguel et al: 11 Use of power factor and specific point energy as design parameters in laser powder-bed-fusion (L-PBF) of AlSi10Mg alloy 11 Materials and Design, Elsevier, Amsterdam, NL, vol. 182, Jul. 6, 2019.

* cited by examiner

ADDITIVE-MANUFACTURING METHODS

FIELD

The present disclosure provides methods of forming products using one or more lasers.

BACKGROUND

A vehicle, such as an aircraft, contains many metallic components. To date, metallic additive manufacturing has focused primarily on titanium, nickel and steel alloys. This has been for a variety of reasons, ranging from ease of deposition to favorable economic factors in the use of these alloys.

However, recent interest has turned to aluminum alloys with a particular focus on how they can be used in the laser powder bed fusion (L-PBF) process. Additively manufactured aluminum allows designers to capture the benefits of additive manufacturing in both performance and weight savings. However, currently, designers are limited to relatively low performance aluminum-silicon casting alloys due to difficulties in processing other conventional high strength aluminum alloys (2XXX, 7XXX series). Currently, the leading additive manufacturing aluminum alloy is Al10SiMg. It is easily deposited, but has mediocre mechanical properties which limit its widespread application. High strength conventional wrought alloys cannot be easily manufactured due to a high susceptibility for solidification cracking and elemental loss during deposition.

There is a need for additive-manufacturing methods of high strength alloys that are capable of suppressing residual stress cracking.

SUMMARY

The present disclosure provides methods of forming products using one or more lasers.

In at least one aspect, a method for powder bed additive manufacturing includes defining a uniform pitch raster path for a laser traveling at a predetermined rate of travel. The raster path alternates back and forth within a strip width of less than 0.5 mm such that the laser's power density level is at least 80 percent of maximum power and the predetermined rate of travel yields a travel speed in the scan width direction of not less than 1,000 mm/s. The method includes depositing a layer of powder onto a substrate and causing the laser to solidify a quantity of the powder according to the defined raster path and the laser power setting.

In at least one aspect, a method for additive manufacturing includes depositing a layer of material onto a substrate. The method includes treating the material with a laser by moving the laser at a travel speed in the scan width direction of not less than 1,000 mm/s in a raster path relative to the substrate. The raster path has a traverse distance of from about 0.1 mm to about 5 mm, a scan width distance of from about # mm to about # mm, and an average hatch spacing of from about 0.04 mm to about 2 mm. The laser has a laser-beam average power of from about 200 W to about 1,000 W, and a laser beam having a beam diameter of from about 0.05 mm to about 0.2 mm.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this present disclosure and are therefore not to be considered limiting of its scope, for the present disclosure may admit to other equally effective examples.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

The present disclosure provides additive-manufacturing methods of high strength alloys. In an example, a method for powder bed additive manufacturing includes defining a uniform pitch raster path within a build chamber for a laser traveling at a predetermined constant rate of travel, where the raster path alternates back and forth within a strip width of less than 0.5 mm such that the laser's power setting and associated power density level is at least 80 percent of maximum power and the predetermined constant rate of travel yields a forward travel speed of not less than 1000 mm/s. The method includes depositing a layer of powder within the build chamber; and causing the laser to solidify a quantity of the powered metal according to the defined raster path and the laser power setting.

Methods of the present disclosure can suppress residual stress cracking by modifying the solidifaction rate of the alloys during processing. For example, by using a narrow strip width of the laser, oscillations of the laser travel path within the stripe are reduced in amplitude. Thus for a set speed of travel, the laser head can move faster along the stripe. Moving the laser head faster allows for an increased laser power to be used as compared to conventional laser sintering processes. In addition, moving the laser faster also allows the previous scan pass melt pool from fully cooling before the next line in the raster in scanned, which creates a significantly slower solidification front which can reduce the rate of solidification shrinkage (and by extension, the strain rate imposed on liquid films at grain boundaries in the melt). The overlapping heat input of adjacent laser passes (e.g., overlapping melt pools) provides uniform heat input and reduced temperature gradient across a stripe of a given part, which reduces the strain induced by CTE and reduces the solidification rate to provide reduced cracking of the part formed.

Figure 1:
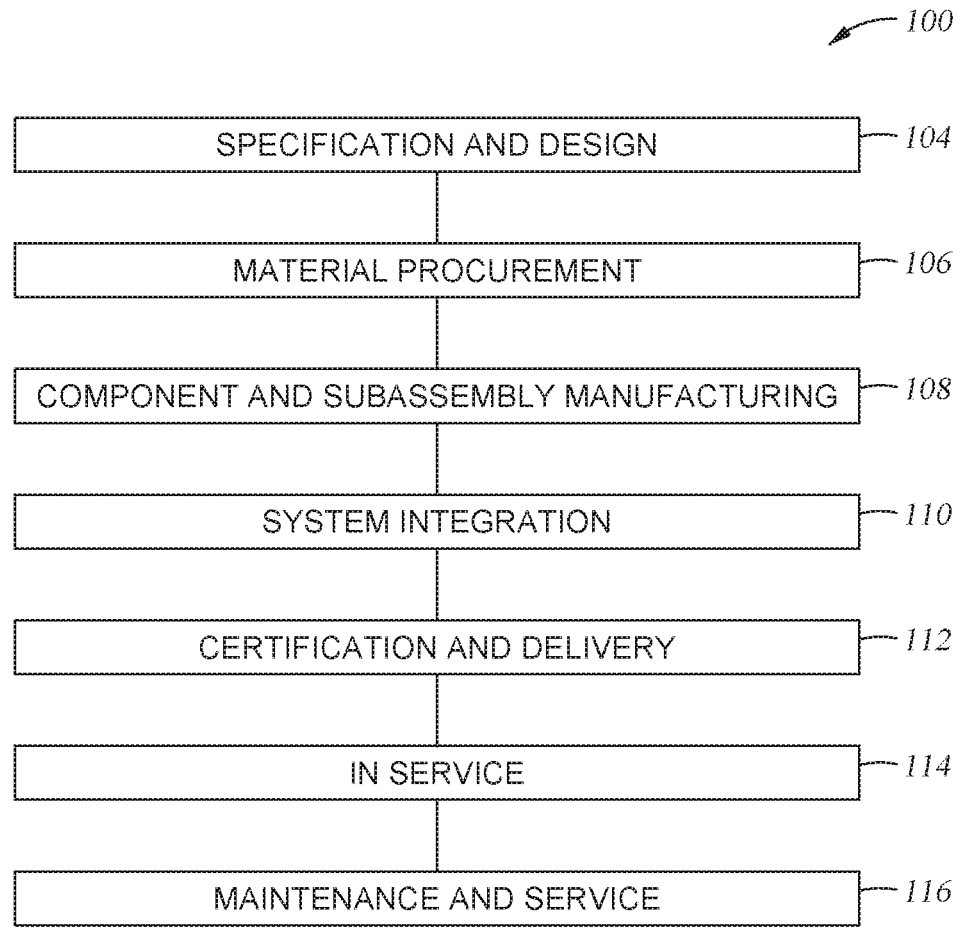
FIG. 1 is a flow diagram of an example of aircraft production and service methodology, according to one or more aspects.
Figure 2:
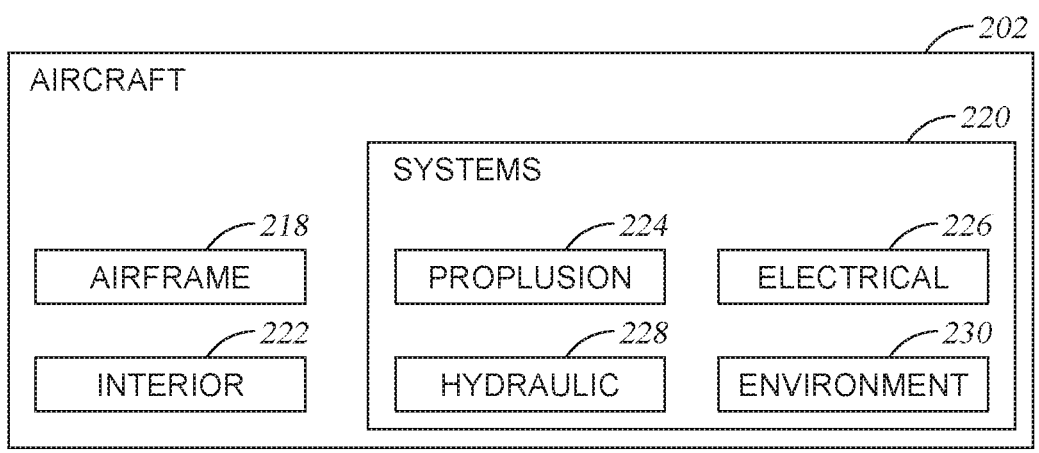
FIG. 2 is a block diagram of one example of an aircraft, according to one or more aspects.

Referring more particularly to the drawings, aspects of the disclosure may be described in the context of an aircraft manufacturing and service method 100 as shown in FIG. 1 and an aircraft 102 as shown in FIG. 2. During pre-production, method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 202 produced by method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may be included. Although an aerospace example is shown, the principles of the present disclosure may be applied to other industries, such as the automotive industry or other industries.

Apparatus and methods embodied herein may be employed during any one or more of the stages of the production and service method 100. For example, components or subassemblies corresponding to production process 206 may be fabricated or manufactured in a manner similar to components or subassemblies produced while the aircraft 202 is in service. Also, one or more apparatus aspects, method aspects, or a combination thereof may be utilized during the production stages 208 and 210, for example, by substantially expediting assembly of or reducing the cost of an aircraft 202. Similarly, one or more of apparatus aspects, method aspects, or a combination thereof may be utilized while the aircraft 202 is in service, for example and without limitation, to maintenance and service 216.

Laser Ablation

Additive manufacturing processes of the present disclosure can include operating an additive manufacturing head that includes a material output and a laser output. The material of the material output is the additive manufacturing material (e.g., aluminum powder) that is deposited onto a surface of a component (such as a vehicle component). The material may be deposited onto a surface of a component before, during, or after laser ablation of the surface.

Figure 3:
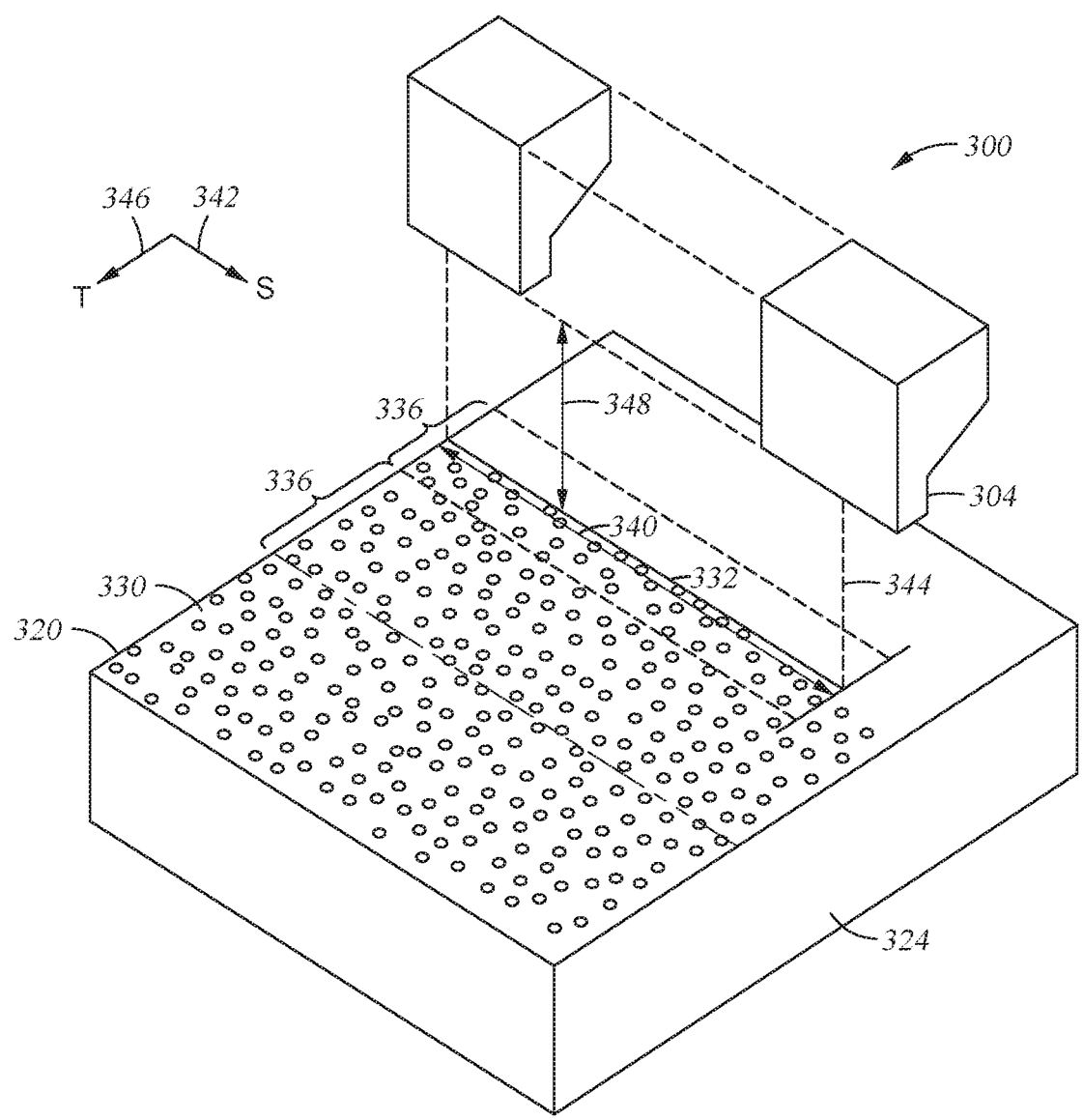
FIG. 3 is a schematic, perspective view of an additive manufacturing apparatus, according to one or more aspects.

Referring generally to FIG. 3, additive-manufacturing apparatus 300 has a material output in addition to a laser output. Before, during, or after, laser ablation, material is deposited onto surface 320 by the material output. The material output may be a hopper configured to gravitationally deposit (or pressurized deposit) material onto surface 320. Materials can be or include aluminum, aluminum alloys, titanium, titanium alloys, nickel, nickel alloys, stainless and alloy steels, cobalt alloys, plastic, polymers, ultem, nylon, or a combination(s) thereof. Aluminum alloys may be or include high strength aluminum alloys such as 2XXX series, 7XXX series, or a combination(s) thereof. Materials can be in powder form, such as fine powders.

Once deposited, the material (e.g., aluminum powder) may undergo a pre-treatment laser pass, which is a low power raster over the material (e.g., powder) to be ablated. The low wattage powder of the laser removes moisture adhered on the material, decreasing the likelihood of porosity developing in the ablated product material from gas bubbles. In addition, the pre-treatment pre-heats the area to be ablated such that when melting does occur, the temperature gradient upon solidification is smaller than it would be without pre-treatment. Accordingly, such pretreatment provides reduced cracking of the ablated product material. A laser-beam average power of a laser used in a pre-treatment stage can be from about 50 W to about 400 W, such as from about 100 W to about 350 W, such as from about 200 W to about 300 W.

Returning to FIG. 3, additive-manufacturing apparatus 300 comprises an additive manufacturing system 304 having one or more lasers configured to emit laser beam 344. System 304 is configured to deliver laser beam 344 onto surface 320. The position of the system 304 may be adjusted to relative positions of surface 320 and system 304. A controller (not shown) is programmed to determine operation parameters and to scan surface 320. The controller is programmed to determine operation parameters, such as traverse scan speed, width scan speed, laser-beam average power, and laser-beam diameter for each one of scan regions 336 of area 330 of surface 320. The traverse scan speed, width scan speed, laser-beam average power, and laser-beam diameter, corresponding to any one of scan regions 336, produce a target fluence and a target irradiance of laser beam 344. The effectiveness of laser ablation is determined by the irradiance (surface density of laser power) and fluence (surface density of accumulated laser energy), among other factors such as laser wavelength, surface material, and material to be ablated. During movement of a laser in a scan width direction, the laser creates a strip across the substrate surface. Accordingly, the laser-beam diameter corresponds with the width of the strip (also referred to as "strip width").

Scan regions 336 are arranged so that all of area 330 of surface 320 is scannable with laser beam 344. Each one of scan regions 336 has a width corresponding to a strip width 340. The controller is programmed to scan area 330 of surface 320 with laser beam 344 at the target fluence and the target irradiance by scanning each one of scan regions 336 at the scan speed, corresponding to that particular one of scan regions 336, and across strip width 340, corresponding to that particular one of scan regions 336. Laser beam 344 has the laser-beam average power, corresponding to that particular one of scan regions 336 and the laser-beam diameter, corresponding to that particular one of scan regions 336.

The laser can be scanned in a raster fashion including a scan width direction 342 and a traverse direction 346. The laser is scanned relatively quickly in scan width direction 342 and relatively slowly in traverse direction 346. Scanning in scan width direction 342 is so rapid that the laser beam may be considered a laser sheet with a width being the strip width (e.g., strip width 340). However, it is noted that the laser beam itself might not have a width that spans strip width 340, but the laser travels along the strip width 340, after which the laser moves a uniform pitch spacing in the traverse direction 346 to begin the next strip width 340. The power of the laser sheet is substantially, if not entirely, the same as the power of the laser beam but the irradiance (the surface density of the power, also referred to as the power density) of the laser sheet is reduced from that of the laser beam. The irradiance is inversely proportional to the width of the laser sheet (strip width). Hence, a smaller strip width produces a larger irradiance and a larger strip width produces a smaller irradiance. A strip width of methods of the present disclosure can be about 0.5 mm or less, such as about 0.3 mm or less, such as about 0.18 mm or less, such as about 0.15 mm or less, such as about 0.12 mm or less, such as about 0.1 mm or less, such as from about 0.1 mm to about 5 mm, such as from about 0.1 mm to about 2 mm, such as from about 0.1 mm to about 0.18 mm, such as from about 0.2 mm to about 0.15 mm, such as from about 0.2 mm to about 0.12 mm, such as from about 0.5 mm to about 1 mm. It has been discovered that a narrow strip width can allow faster movement of a laser along the substrate and an increased laser power to be used. These parameters can provide decreased hatch spacing which provides reduced cracking and stress reduction of an ablated product material.

The ablation effectiveness (i.e., the effectiveness of ablation) of laser ablation is determined by the surface density of laser power and the surface density of laser energy at surface 320. The surface density of laser power (laser power divided by surface area receiving that power) is known as irradiance. The surface density of laser energy (laser energy divided by surface area receiving that energy) is known as fluence. Other factors, such as laser wavelength, surface material, and material to be ablated, also may affect the ablation effectiveness.

Additive-manufacturing apparatus 300 is configured to adjust operation parameters for each of scan regions 336 such that each of scan regions 336 is scanned with the same target fluence and the same target irradiance. Scanning with the same fluence and irradiance provides the same ablation effectiveness for each of scan regions 336. The fluence and irradiance are primarily determined by the strip width. If the strip width changes (while the scanning speed remains constant), the fluence and/or irradiance are changed because the residence time of the laser at the surface is adjusted.

Scan regions 336 are arranged within area 330 of surface 320. Surface 320 is a surface of workpiece 324 to be ablated by laser ablation by apparatus 300. Generally, workpiece 324 includes hard and/or resilient materials such as metal (such as high strength aluminum) and/or ceramic. Surface 320 may be a substantially metal and/or ceramic surface.

Workpiece 324 can be a component, such as a blade of a wind turbine. In at least one aspect, workpiece 324 is a vehicle component. A vehicle component is any suitable component of a vehicle, such as a structural component, such as a panel or joint, of an aircraft, automobile, etc. Examples of a vehicle component include an airfoil (such as a rotor blade), an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

Scan regions 336 are each a distinct region of area 330 (scan regions 336 may partially overlap). Each of scan regions 336 may be a small section of area 330 and may be substantially the area swept by laser beam 344 in scan width direction 342. Laser beam 344 is directed by additive manufacturing system 304 to move substantially continuously and sequentially among scan regions 336. Hence, completion of one of scan region 336 is followed by the start of another of scan region 336. Individual ones of scan regions 336 are distributed in traverse direction 346.

In a raster fashion, a laser travels a traverse distance, and a scan width distance that corresponds to a strip width 340, where each strip width 340 that the laser travels along is separated from the next strip width by a uniform pitch spacing that corresponds to the traverse distance. Accordingly, because of the narrow scan widths of methods of the present disclosure, traverse distances can also be small, which provides uniform heat input and reduced temperature gradient across a stripe of a given part, reducing the strain and solidification rate. A traverse distance of methods of the present disclosure can be about 5 mm or less, such as about 2 mm or less, such as about 0.18 mm or less, such as about 0.15 mm or less, such as about 0.12 mm or less, such as about 0.1 mm or less, such as from about 0.1 mm to about 5 mm, such as from about 0.1 mm to about 2 mm, such as from about 0.1 mm to about 0.18 mm, such as from about 0.2 mm to about 0.15 mm, such as from about 0.2 mm to about 0.12 mm, such as from about 0.5 mm to about 1 mm. A scan width distance of methods of the present disclosure can be about 0.3 mm or less, such as about 0.25 mm or less, such as about 0.2 mm or less, such as about 0.15 mm or less, such as about 0.1 mm or less, such as about 0.08 mm or less, such as from about 0.05 mm to about 0.3 mm, such as from about 0.08 mm to about 0.25 mm, such as from about 0.1 mm to about 0.25 mm, such as from about 0.1 mm to about 0.2 mm, such as from about 0.15 mm to about 0.2 mm, such as from about 0.15 mm to about 0.18 mm. The traverse distance and scan width distance collectively provide a scan density of a particular surface area, such that a method of the present disclosure is performed at a scan density. For example, a scan density can be high, such as from about 5,000 laser passes per $m^2$ to about 25,000 laser passes per $m^2$, such as from about 8,750 laser passes per $m^2$ to about 18,750 laser passes per $m^2$. It has been discovered that a high scan density can provide uniform heat input and reduced temperature gradient across a stripe of a given part, reducing the strain and solidification rate.

Furthermore, small traverse distances of the present disclosure provide small hatch spacing. As used herein, the term "hatch spacing" can refer to the uniform pitch spacing or distance between two adjacent scan width passes. The average of the hatch spacings of a given scanned area (e.g., passes per $m^2$) is referred to as "average hatch spacing". A method of the present disclosure can be performed at a low average hatch spacing. For example, an average hatch spacing can be from about 0.04 mm to about 2 mm, such as from about 0.07 mm to about 0.15 mm, such as from about 0.09 mm to about 0.13 mm, such as about 0.11 mm.

The laser and laser beam 344 have several characteristics that may be adjusted to control irradiance and fluence in each of scan regions 336. A laser of the present disclosure can have a constant output (e.g., the output is not pulsed). Laser beam 344 has a laser-beam average power and a laser-beam spot area (the area of laser beam 344 as it impinges surface 320). Laser beam 344 is swept across scan regions 336, in scan width direction 342, at a raster path scan speed (which may be different for different ones of scan regions 336). Laser beam 344 is swept between scan regions 336, in traverse direction 346, at a traverse scan speed (which may be different for different ones of scan regions 336). Each one of the characteristics (traverse scan speed, raster path scan speed, laser-beam average power, and laser-beam spot area) may be controlled or adjustable by additive-manufacturing apparatus 300 independently for each of scan regions 336. Some, but not all, of the characteristics may be the same for each of scan regions 336. In at least one aspect, a method of the present disclosure includes sweeping a laser (and laser beam) in a scan width direction at a raster path scan speed of not less than 1,000 mm/s, such as from about 1,100 mm/s to about 3,000 mm/s, such as from about 1,300 mm/s to about 2,800 mm/s, such as from about 1,500 mm/s to about 2,500 mm/s, such as from about 1,700 mm/s to about 2,200 mm/s. In at least one aspect, a method of the present disclosure includes a laser (and laser beam) traveling at a predetermined rate of travel along a uniform pitch raster path, wherein the raster path alternates back and forth within a strip width of less than 0.5 mm such that the laser's power density level is at least 80 percent of maximum power, and the predetermined rate of travel results a travel speed in the scan width direction of not less than 1,000 mm/s. A method of the present disclosure includes sweeping a laser (and laser beam) at a traverse scan speed of not less than 1,000 mm/s, such as from about 1,100 mm/s to about 3,000 mm/s, such as from about 1,300 mm/s to about 2,800 mm/s, such as from about 1,500 mm/s to about 2,500 mm/s, such as from about 1,700 mm/s to about 2,200 mm/s. In at least one aspect, a laser (and laser beam) are moved (swept) in a scan width direction at a raster path scan speed that is substantially the same as the traverse scan speed. The laser can have a laser-beam average power of from about 200 W to about 1,000 W, such as from about 300 W to about 600 W, such as from about 400 W to about 500 W, such as from about 400 W to about 450 W. By using a narrow strip width of the laser, oscillations of the laser travel path within the stripe are reduced in amplitude. Thus for a set speed of travel, the laser head can move faster along the stripe. Moving the laser head faster allows for an increased laser power to be used (while obtaining the reduced heat gradient) as compared to conventional laser sintering processes. In at least one aspect, the laser can have a power density level that is at least 80 percent of the maximum power of the laser, such as at least about 85 percent, such as at least about 90 percent, such as at least about 95 percent, such as at least about 99 percent, such as about 100 percent.

For additive-manufacturing apparatus 300, irradiance is a function of the laser-beam average power and the laser-beam spot area (determined by laser beam diameter). As used herein, target irradiance refers to peak irradiance, i.e., laser-beam peak power divided by the surface covered by laser beam 344. Generally, laser-beam peak power is a function of the laser-beam average power. The target irradiance may be increased by increasing the laser-beam average power and/or decreasing the laser-beam spot area (e.g., decreasing the beam diameter). If the laser-beam average power is decreased, the target irradiance may be maintained by compensating decreases (proportional) in the laser-beam spot area. In at least one aspect, a laser beam of the present disclosure has a beam diameter of from about 0.05 mm to about 0.2 mm, such as from about 0.05 mm to about 0.18 mm, such as from about 0.08 mm to about 0.15 mm, such as from about 0.1 mm to about 0.14 mm, such as about 0.13 mm.

For additive-manufacturing apparatus 300, fluence is a function of the laser-beam average power, strip width 340, and the traverse scan speed. As used herein, target fluence refers to fluence of laser beam 344 as it is scanned across area 330. Target fluence may be calculated according to:

$$F = P/(S_w \times T_s) \quad \text{(Eq. 1)}$$

where F is target fluence, P is laser-beam average power, $S_w$ is strip width 340, and $T_s$ is traverse scan speed. The target fluence may be decreased by decreasing the laser-beam average power, increasing strip width 340, and/or increasing the traverse scan speed. If strip width 340 is decreased, the target fluence may be maintained by a compensating increase (inverse proportional) in the traverse scan speed.

Raster path scan speed, strip width 340, and traverse scan speed are implemented by additive manufacturing system 304. Additive manufacturing system 304 has one or more lasers configured to deliver laser beam 344 to surface 320 in area 330 (e.g., in scan regions 336). Additive manufacturing system 304 is configured to scan laser beam 344 a scan width distance corresponding to a strip width 340, for each of scan regions 336, in strip width direction 344 along scan line 332 at a rate of the raster path scan speed. Scan line 332 is not necessarily a straight line and may be an arc, a curve, and/or a segmented line. Generally, the raster path scan speed is much faster than the traverse scan speed such that laser beam 344, as it is scanned at raster path scan speed, may be treated as a laser sheet. For example, the raster path scan speed may be greater than 1,000 times the traverse scan speed. Additive manufacturing system 304 is configured to optically scan laser beam 344 because optically scanning laser beam 344 is generally much faster than mechanically scanning laser beam 344. Additive manufacturing system 304 includes a laser scanning apparatus for high speed scanning such as a mirror galvanometer and/or a polygonal mirror. Raster path scan speed and traverse scan speed may be varied independently.

Selection of a nominal strip width, a target fluence, and a target irradiance may provide sufficient information to determine a nominal laser-beam average power, a nominal traverse scan speed, and/or a nominal laser-beam spot area. Alternatively, the nominal parameters may define the target fluence and target irradiance. Selection of nominal strip width, target fluence, and/or target irradiance may be useful to tune additive-manufacturing apparatus 300 to manufacture different materials as may be present on various workpieces 324.

Scan regions 336 may be determined by inspection or modelling of surface 320. Scan regions 336 may be determined by sectioning area 330 into a series of regions, each of which may be described by only one strip width 340 for the region (individual ones of scan regions 336). Scan regions 336 may be determined by other devices and/or a human operator and then provided to controller 310 to follow the pattern of scan regions 336 provided. Hence, controller 310 may be dedicated to scanning operations and may not need to determine scan regions 136.

Scan regions 336 may be determined by identifying area 330 of surface 320 and sectioning area 330 into scan regions 336. A virtual model of surface 320 and/or workpiece 324 may facilitate precise determination of location of area 330 and/or scan regions 336. The virtual model may be a two-dimensional (2D) or three-dimensional (3D) model and may be an electronic description of surfaces, boundaries, and/or points that describe surface 320 and/or workpiece 124. For example, the virtual model may be a CAD (computer aided design) model, a boundary representation, and/or a surface tessellation.

Each one of scan regions 336 may have different strip width 340 (at least one strip width 340 is different). Strip width 340 of each one of scan regions 336 may be determined by the size of scan regions 336 and/or area 330 determined from the virtual model of surface 320. The virtual model of surface 320 and/or workpiece 324 may facilitate precise determination of strip width 340 for each one of scan regions 336.

Laser ablation of surface 320 begins at one of scan regions 336 and continues with each of the other scan regions 336. The first one of scan regions 336 may be selected based upon proximity to an edge of area 330 and/or proximity to other scan regions 336. Ordering of scan regions 336 permits efficient laser ablation of area 330 of surface 320. For example, arranging first one of scan regions 336 and subsequent scan regions 336 such that completion of the first one of scan regions 336 (and subsequent scan regions 336) is at or near the next one of scan regions 336 permits additive manufacturing apparatus 300 to scan area 330 with little time (or no time) devoted to moving between scan regions 336.

As mentioned above, a controller is programmed to determine the traverse scan speed, the laser-beam average power, and the laser-beam spot area by equating the traverse scan speed to a maximum traverse scan speed and determining the scan speed in proportion to strip width 340 for each one of scan regions 336 when strip width 340 is less than a first critical strip width and greater than or equal to a second critical strip width. The first critical strip width is greater than the second critical strip width.

Additive-manufacturing apparatus 300 may have a maximum traverse scan speed. For example, traverse scan speed may be limited by reliable operation of mechanical components translating additive manufacturing system 304 and/or workpiece 324. For scan regions 336 in which strip width 340 is less than the first critical strip width, target fluence may be achieved by selecting a traverse scan speed greater than the maximum traverse scan speed. Smaller strip width 340 may involve larger traverse scan speed to produce the same target fluence. If strip width 340 is small enough (i.e., less than the first critical strip width) to imply a traverse scan speed greater than the maximum traverse scan speed, traverse scan speed may be set to the maximum traverse scan speed and the laser-beam average power reduced to achieve the target fluence based on the maximum traverse scan speed and strip width 340 that is less than the first critical strip width. The laser-beam average power may be reduced in proportion to strip width 340 (according to Eq. 1) to achieve the target fluence.

Scan regions 336 are contiguous with each other, i.e., neighboring scan regions 336 touch, partially overlap, and/or connect with each other. With contiguous scan regions 336, laser beam 344 may be scanned from one of scan regions 336 to the next of scan regions 336 in a continuous motion, without needing to translate surface 320 relative to additive manufacturing system 304 between scan regions 336. Hence, scanning contiguous scan regions 336 does not need to incur delay between scan regions 336 and consequent inefficiency of ablation of area 330. Contiguous scan regions 336 provide for area 330 that is continuous and that may be characterized by having a single boundary to encompass all of scan regions 336. Area 330 that is continuous may have no internal voids or vacancies (regions not included in one of scan regions 336).

Scan spacing 348, separating additive manufacturing system 304 from area 330 of surface 320, is substantially constant within each one of scan regions 336. Substantially constant (or uniform) scan spacing 348 within one of scan regions 336 may establish a substantially constant (or uniform) laser-beam spot area in that one of scan regions 336. For each of scan regions 336, scan spacing 348 may be substantially constant (or uniform), though different ones of scan regions 336 may be scanned with different scan spacing 348 values. Scan spacing 348 (and hence possibly the laser-beam spot area) may be adjusted for each one of scan regions 336 independently.

Scan spacing 348 might not vary between scan regions 336, which may facilitate transitions between scan regions 336 without translation of surface 320 relative to additive manufacturing system 304. Substantially constant (or uniform) scan spacing 348 for all scan regions 336 might not preclude adjustment of laser-beam spot area (e.g., diameter). The laser-beam spot area may be varied as necessary or desired by adjusting the focal distance of surface 320 from additive manufacturing system 304.

Scanning each of scan regions 336 at a perpendicular (normal) angle of incidence may provide for effective ablation in scan regions 336. Laser beam 344 may have higher (or maximum) target irradiance when laser beam 344 is oriented normal to surface 320. If laser beam 344 impinges surface 320 at an angle significantly different from normal (perpendicular), the spot of laser beam 344 may distort and become larger (thus reducing target irradiance). As used herein, a normal angle of incidence is approximately perpendicular to surface 320 (at about 90°, e.g., from about 80° to about 100°, such as from about 85° to about 95°).

By selecting the target fluence and the target irradiance appropriately, area 330 may be efficiently ablated without significant over ablation, significant under ablation, or unintentionally scanning of regions outside of area 330. Relative to conventional laser ablation, changes in strip width 340 between scan regions 336 are compensated to maintain the target fluence and the target irradiance for all of scan regions 336.

Operation parameters (e.g., traverse scan speed, laser-beam average power, and laser-beam spot area) can be determined independently for each one of scan regions 336 based on strip width 340 for that one of scan regions 336, the target fluence, and the target irradiance. Operation parameters may be determined based on target fluence and target irradiance.

Scan regions 336 can be sequentially scanned such that scan regions 336 are arranged within area 330 of surface 320 and are ordered. Sequentially scanning includes scanning each one of scan regions 336, one after the other, in sequential order. Scanning sequentially may reduce time moving additive manufacturing system 304, laser beam 344, and/or workpiece 324 between scan regions 336 and, hence, may increase efficiency relative to scanning out of order.

Sequentially scanning of surface 320 can begin at one of scan regions 336 and continue with each of the other scan regions 336. The first one of scan regions 336 may be selected based upon proximity to an edge of area 330 and/or proximity to other scan regions 336. Ordering of scan regions 336 permits efficient laser ablation of area 330 of surface 320. For example, arranging first one of scan regions 336 and subsequent scan regions 336 such that completion of the first one of scan regions 336 (and subsequent scan regions 336) is at or near the next one of scan regions 336 permits additive manufacturing apparatus 300 to scan area 330 with little time (or no time) devoted to moving between scan regions 336.

When strip width 340 of at least one of scan regions 336 is different from strip width 340 of another one of scan regions 336, at least one of the traverse scan speed, the laser-beam average power, or the laser-beam spot area of laser beam 344 for at least the one of scan regions 336 is different from at least one of the traverse scan speed, the laser-beam average power, or the laser-beam spot area of laser beam 344 for the other one of scan regions 336.

To maintain the target fluence and the target irradiance for all of scan regions 336, one or more changes in the traverse scan speed, the laser-beam average power, and/or the laser-beam spot area may be used to compensate for changes in strip width 340 among scan regions 336.

The traverse scan speed is the laser-beam average power divided by a product of strip width 340 and target fluence. If initial laser-beam average power and strip width 340 (for at least one of scan regions 336) is suitable to set traverse scan speed (e.g., the calculated traverse scan speed is within limits of operation), the traverse scan speed is the product of strip width 340 of at least one of scan regions 336 and the target fluence.

Laser beam 344 has an initial laser-beam average power. Scan regions 336 comprise an adapted scan region. Determining the traverse scan speed, the laser-beam average power, and the laser-beam spot area for each one of scan regions 336 comprises determining that a projected traverse scan speed for the adapted scan region is greater than a maximum traverse scan speed. The projected traverse scan speed for the adapted scan region is the initial laser-beam average power divided by a product of strip width 340 of the adapted scan region and the target fluence. Methods of the present disclosure can include determining an adapted laser-beam average power that is a product of the target fluence, strip width 340 of the adapted scan region, and the maximum traverse scan speed.

Additive-manufacturing apparatus 300 may have a maximum traverse scan speed. For example, traverse scan speed may be limited by reliable operation of mechanical components (i.e., components of laser-positioning apparatus 306) additive manufacturing system 304 and/or workpiece 324. For scan regions 336 in which strip width 340 is less than a first critical strip width, target fluence may be achieved by selecting a projected traverse scan speed greater than the maximum traverse scan speed. Such scan regions 336 may be referred to as adapted scan regions because adaptation of operation parameters is required to achieve the target fluence and not exceed the maximum traverse scan speed. For adapted scan regions, the projected traverse scan speed may be set to the maximum traverse scan speed and the adapted laser-beam average power may be reduced from the initial laser-beam average power to achieve the target fluence based on the maximum traverse scan speed and strip width 340 of the adapted scan region. The adapted laser-beam average power may be set according to Eq. 1, i.e., the adapted laser-beam average power is the product of the target fluence, strip width 340 of the adapted scan region, and the maximum traverse scan speed.

Scanning area 330 of surface 320 comprises scanning the adapted scan region at the maximum traverse scan speed across strip width 340 of the adapted scan region while laser beam 344 has the adapted laser-beam average power, and the laser-beam spot area for the adapted scan region.

Determining the traverse scan speed, the laser-beam average power, and the laser-beam spot area for each one of scan regions 336 comprises determining that a projected laser pulse repetition rate for the adapted scan region is less than a minimum laser pulse repetition rate. The projected laser pulse repetition rate for the adapted scan region is the adapted laser-beam average power divided by a product of the target irradiance, and the laser-beam spot area for the adapted scan region.

Using the same target fluence and target irradiance for each of scan regions 336 facilitates uniform ablation across area 330.

Selection of a nominal strip width, a target fluence, and a target irradiance may provide sufficient information to determine a nominal laser-beam average power, a nominal traverse scan speed, and/or a nominal laser-beam spot area. Alternatively, the nominal parameters may define the target fluence and target irradiance. Selection of nominal strip width, target fluence, and/or target irradiance may be useful to tune additive manufacturing apparatus 300 to ablate different materials (of surface 320) as may be present on various workpieces 324.

Methods of the present disclosure may include determining a maximum strip width that is a maximum average power of laser beam 344 divided by a product of the target fluence and a maximum traverse scan speed. The maximum average power of laser beam 344 may be limited by laser 302 operation limits. The maximum traverse scan speed may be limited by mechanical limits of additive manufacturing apparatus 300. The maximum strip width, as determined, may be used to qualify area 330 for the potential for ablation, to divide area 330 into separate subareas with no strip width 340 greater than the maximum strip width, and/or to section area 330 into scan regions 336 that each have strip width 340 that is less than or equal to the maximum strip width.

Determining operation parameters (e.g., traverse scan speed, laser-beam average power, and laser-beam spot area) may be performed during scanning of scan regions 336. Before scanning an individual one of scan regions 336, operation parameters for that individual one of scan regions 336 are determined. Determining operation parameters for one of scan regions 336 is a prerequisite only for scanning that one of scan regions 336. Determining operation parameters may be done for one of scan regions 336 at a time (e.g., just prior to beginning scanning for individual ones of scan regions 336 and/or as individual ones of scan regions 336 are received and/or determined). Determining operation parameters at least partially concurrently with scanning permits dynamic changes of operation parameters and/or scan regions 336 during scanning. Additionally or alternatively, determining operation parameters at least partially concurrently with scanning may overlap the computational overhead time needed to determine operation parameters with the movement of additive manufacturing system 304, laser beam 344, and/or workpiece 324 during scanning, hence, increasing operational efficiency.

The raster scan speed may be determined according to the amount and/or type of material to be ablated, the optical absorbance of the material to be ablated, and the laser wavelength. Slower raster scan speeds may deposit more energy into a small region of surface 320 (i.e., a region the size of the laser-beam spot area) in a shorter time than faster raster scan speeds. Faster raster scan speeds may be beneficial to reduce thermal effects on the underlying material of surface 320 as laser beam 344 ablates the overlying material. Faster raster scan speeds may permit vapor and/or particulates (e.g., smoke) to dissipate sufficiently to reduce optical interference with laser beam 344 (relative to slower raster scan speeds). Generally, the raster scan speed is sufficiently fast to treat the scanned laser beam 344 as a laser sheet. The raster scan speed can be greater than (or equal to) a product of strip width 340 and the traverse scan speed divided by an effective average diameter of the laser-beam spot area for each one of scan regions 336.

The raster scan speed may be great enough that the entirety of each one of scan regions 336 is scanned by laser beam 344 before laser beam 344 is moved at traverse scan speed in traverse direction 346 the distance of an effective average diameter of the laser-beam spot area. Scanning at such a raster scan speed provides for uniform coverage of scan regions 336 and area 330. The effective average diameter of laser-beam spot area is the diameter of a circle having the same area as the laser-beam spot area. The laser-beam spot area may or may not have a circular profile.

The raster scan speed may be set to accommodate the maximum strip width and the maximum traverse scan speed that may be achieved for a given apparatus (such as additive manufacturing apparatus 300). Such a raster scan speed may be used for each of scan regions 336. Hence, the raster scan speed does not need to be changed between scan regions 336 to maintain the target fluence or target irradiance.

The illustrated additive-manufacturing equipment and processes and the recitation of other examples of additive-manufacturing equipment and processes herein are not intended to be limiting upon the present disclosure in any way. Rather, the illustrated and described additive-manufacturing equipment and processes are intended to demonstrate aspects of the present disclosure. The additive-manufacturing apparatus 300 is capable of including any type of additive-manufacturing equipment and all of such possibilities are intended to be within the spirit and scope of the present disclosure.

Hardware for Performing Methods

Referring now to FIGS. 4-12, an example of an additive-manufacturing system 304 is illustrated and is configured to form a part or product 404 (see FIG. 4) (which can be workpiece 324 of FIG. 3), which may be utilized in a variety of industries including, but not limited to, aerospace, automotive, etc. The additive-manufacturing system 304 is configured to create a wide variety of products 404, having different shapes and sizes, as well as various levels of complexity. Products 404 may be made of a variety of materials including metal, aluminum, aluminum alloys, titanium, titanium alloys, nickel, nickel alloys, stainless and alloy steels, cobalt alloys, plastic, polymers, ultem, nylon, or a combination(s) thereof.

The additive-manufacturing system 304, according to one or more aspects of the present disclosure, is capable of comprising a wide variety of additive-manufacturing equipment. In the illustrated system, the system 304 includes laser additive-manufacturing equipment. Other examples of a system of the present disclosure may incorporate alternative additive-manufacturing equipment such as, for example, fused-deposition modeling (FDM), multi-jet modeling (MJM), 3D-printing, rapid-prototyping, direct digital manufacturing, layered-manufacturing, and additive-fabrication equipment.

System 304 may include two surface-processing devices 412 for processing two surfaces 416, 420 of a product 404 formed by the additive-manufacturing head 408. Surfaces 416, 420 may be, for example, an interior and an exterior surface, respectively. The system 304 may also be configured to include a single surface-processing device 412 for treating a single surface of a product formed by the additive-manufacturing head 408. Still further, the system 400 may include more than two surface-processing devices 412 for treating any number of surfaces 416, 420 of a product 404 formed by the additive-manufacturing head 408. In the illustrated system 304, the two surface-processing devices 412 are substantially similar in structure and function. In other examples of the system 304, the system may include two or more surface-processing devices 412 and such devices may be different in structure and function. The description herein and the associated figures include two similar surface-processing devices 412, having similar structure and function.

Surface-processing device 412 can be configured to smooth a surface of a product formed by the additive-manufacturing head 408. In other words, the surface-processing device 412 can be configured to reduce the roughness of a surface of a product formed by the additive-manufacturing head 408. The surface-processing device 412 is movably coupled to the additive-manufacturing head 408. The surface-processing device 412 may also be rotatably coupled to the additive-manufacturing head 408. The surface-processing device 412 may be coupled to the additive-manufacturing head 408 in a variety of ways. The additive-manufacturing system 304 also includes a housing 424, rotatably coupled to the additive-manufacturing head 408. The surface-processing device 412 is coupled to the housing 424. The housing 424 is configured to rotate about a virtual longitudinal central axis 428 (FIG. 6), extending longitudinally and centrally through the additive-manufacturing head 408. As shown, for example, in FIG. 9, the system 304 may include means 426 for rotatably positioning the housing 424 relative to the additive-manufacturing head 408. In one aspect, the means 426 may be a servo-motor coupled to the housing 424. Referring, once again, to FIG. 3, the housing 424 may be rotatably coupled to the additive manufacturing head via, e.g., ball bearings 440 between the additive manufacturing head 408 and the housing 424. In one example, the means 426 may be coupled to the housing 424 for rotatably positioning the housing 424 relative to the manufacturing head 408.

Figure 4:
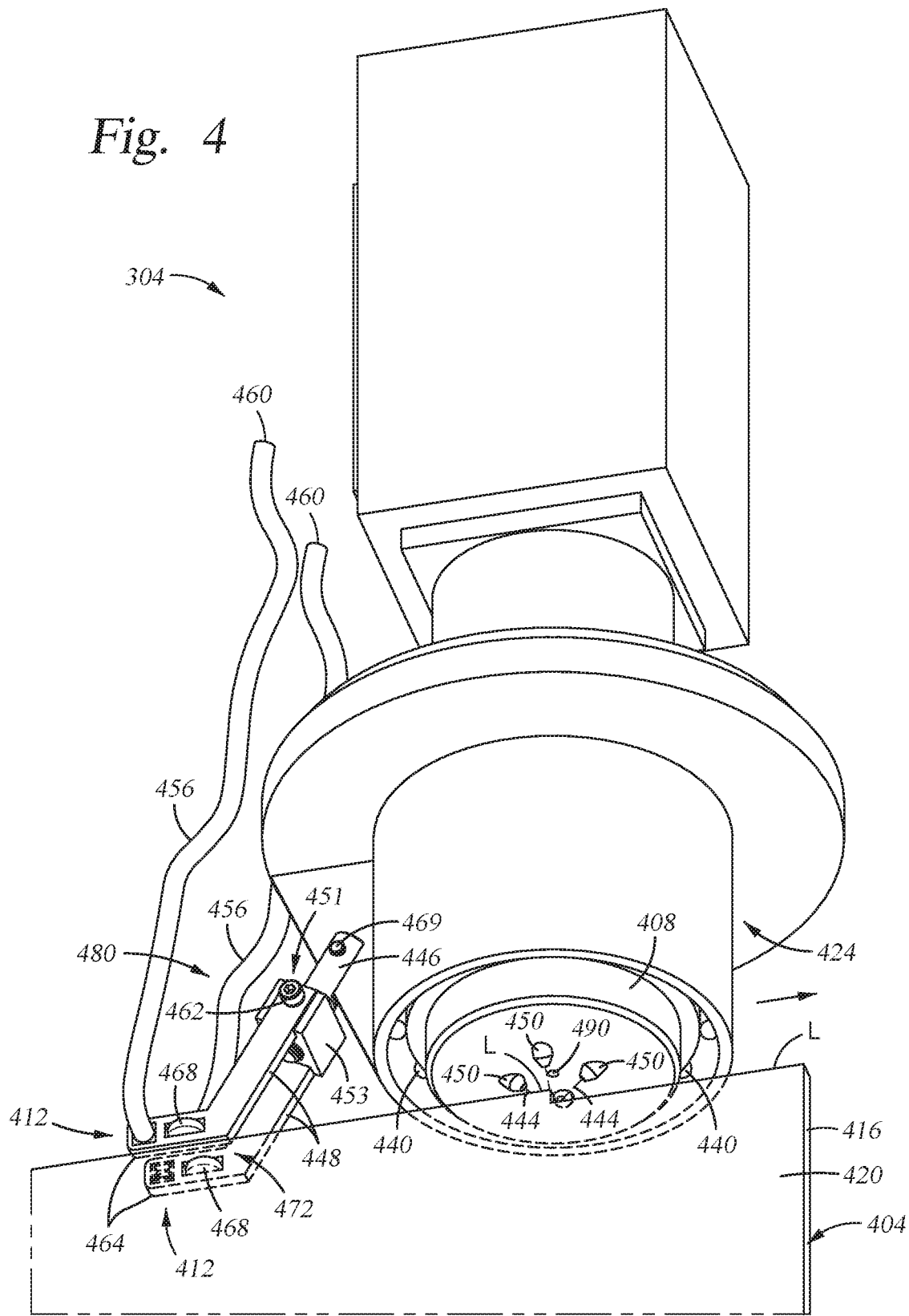
FIG. 4 is a bottom isometric view of one example of an additive-manufacturing system and a portion of one example of a part or product manufactured by the additive-manufacturing system, according to one or more aspects.
Figure 5:
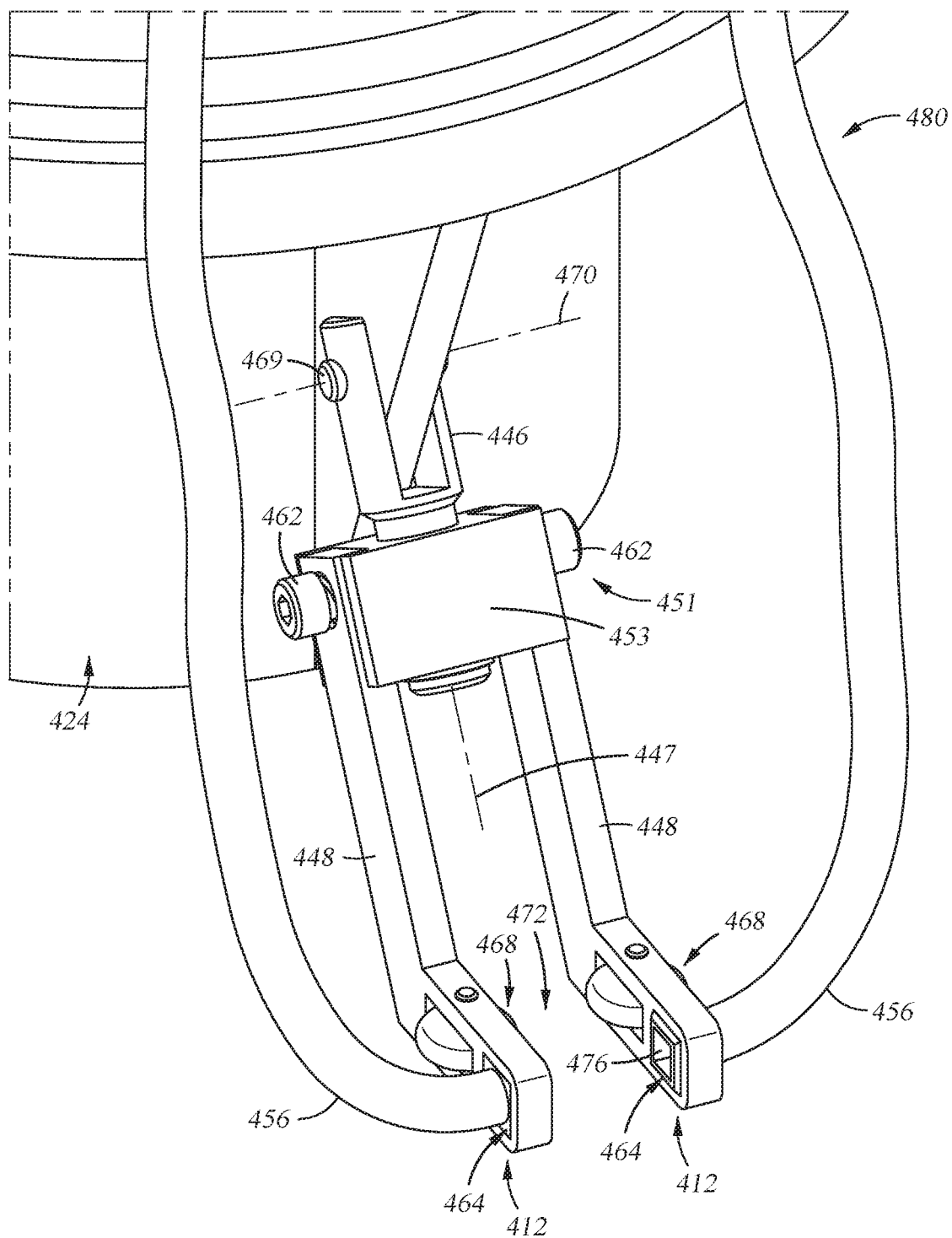
FIG. 5 is a top isometric view of a portion of the additive-manufacturing system shown in FIG. 4, according to one or more aspects.
Figure 6:
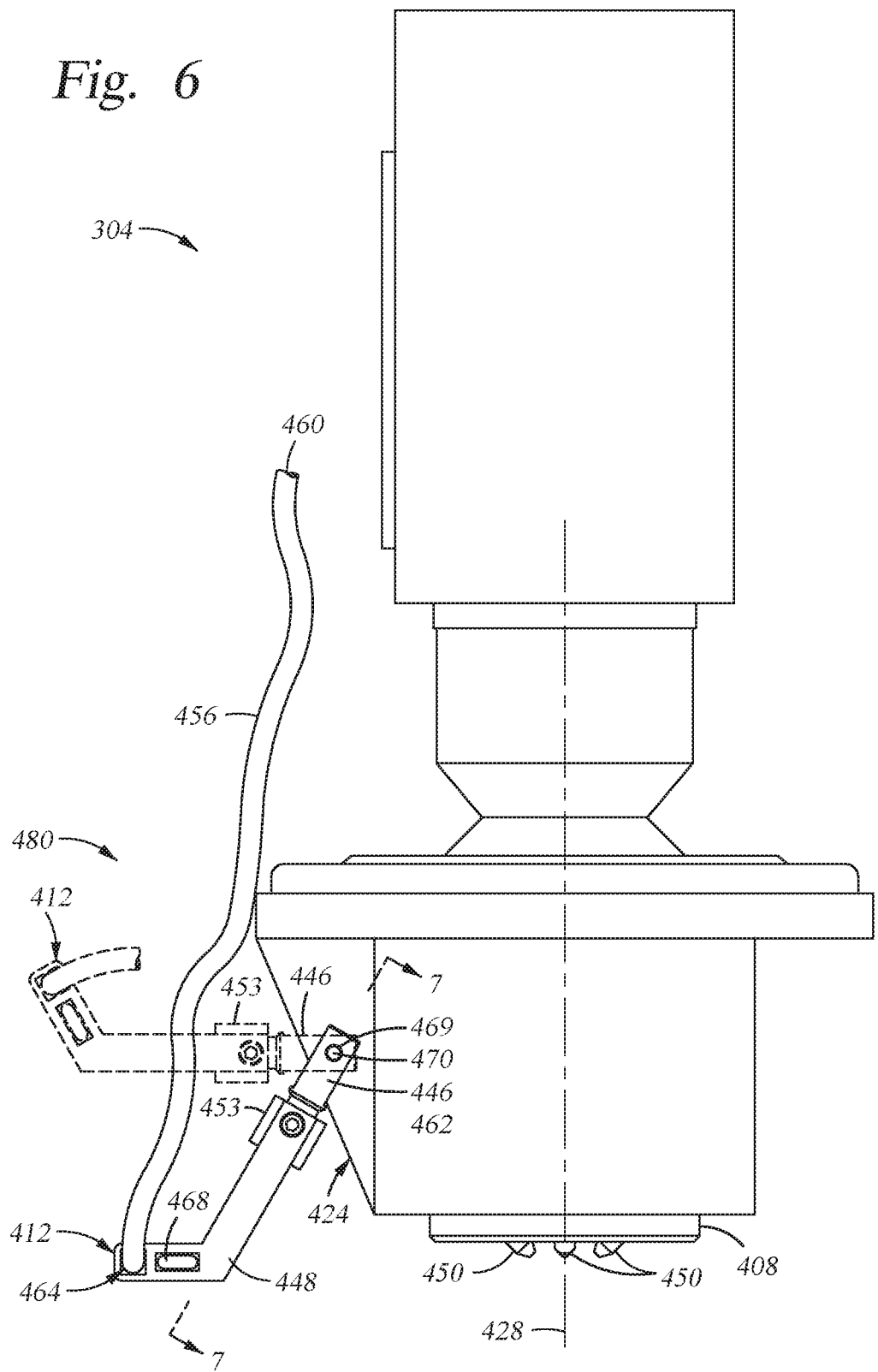
FIG. 6 is an elevational view of the additive-manufacturing system shown in FIG. 4, according to one or more aspects.
Figure 7:
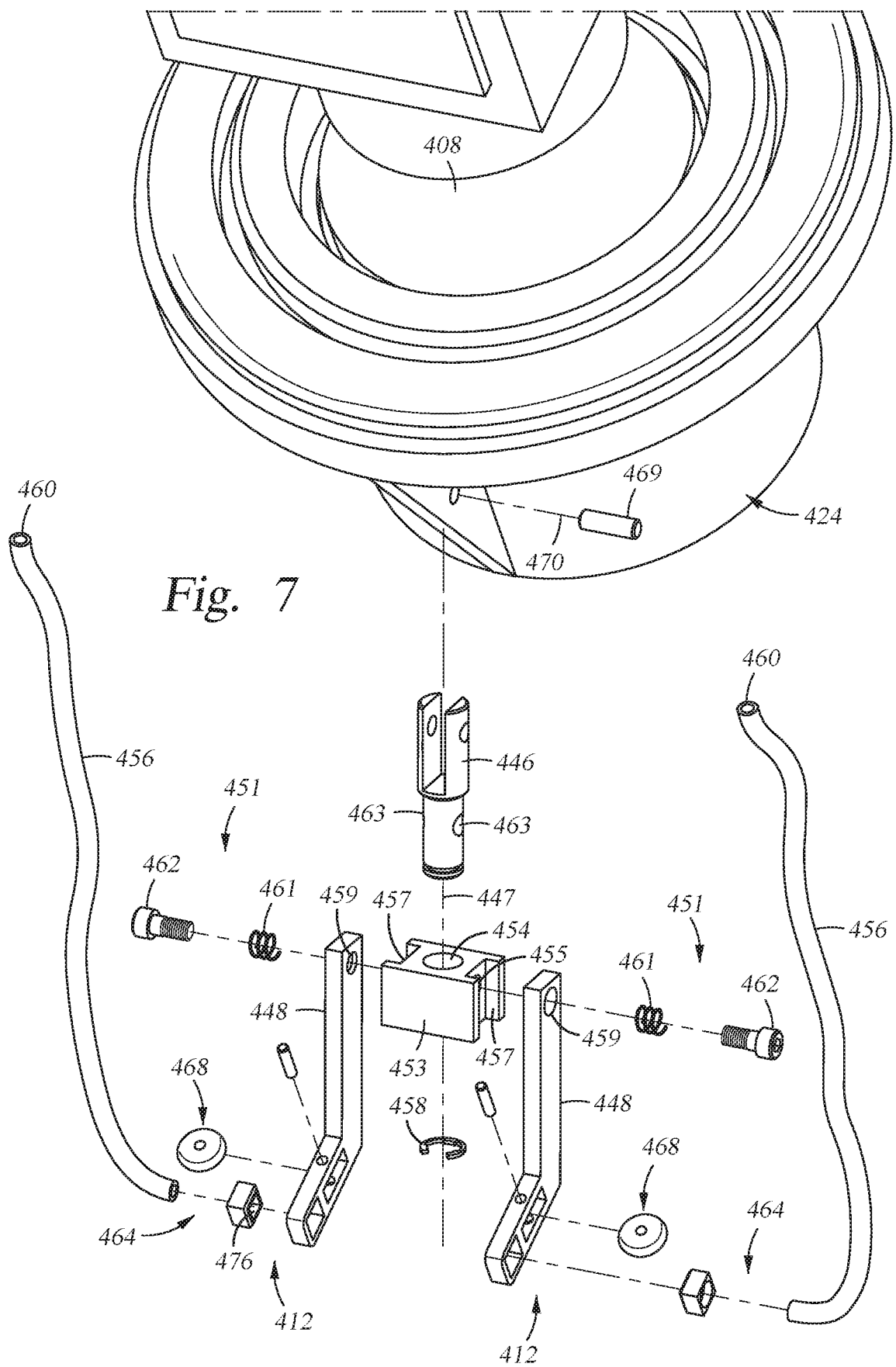
FIG. 7 is a partially exploded view of the additive-manufacturing system shown in FIG. 4, according to one or more aspects.
Figure 8:
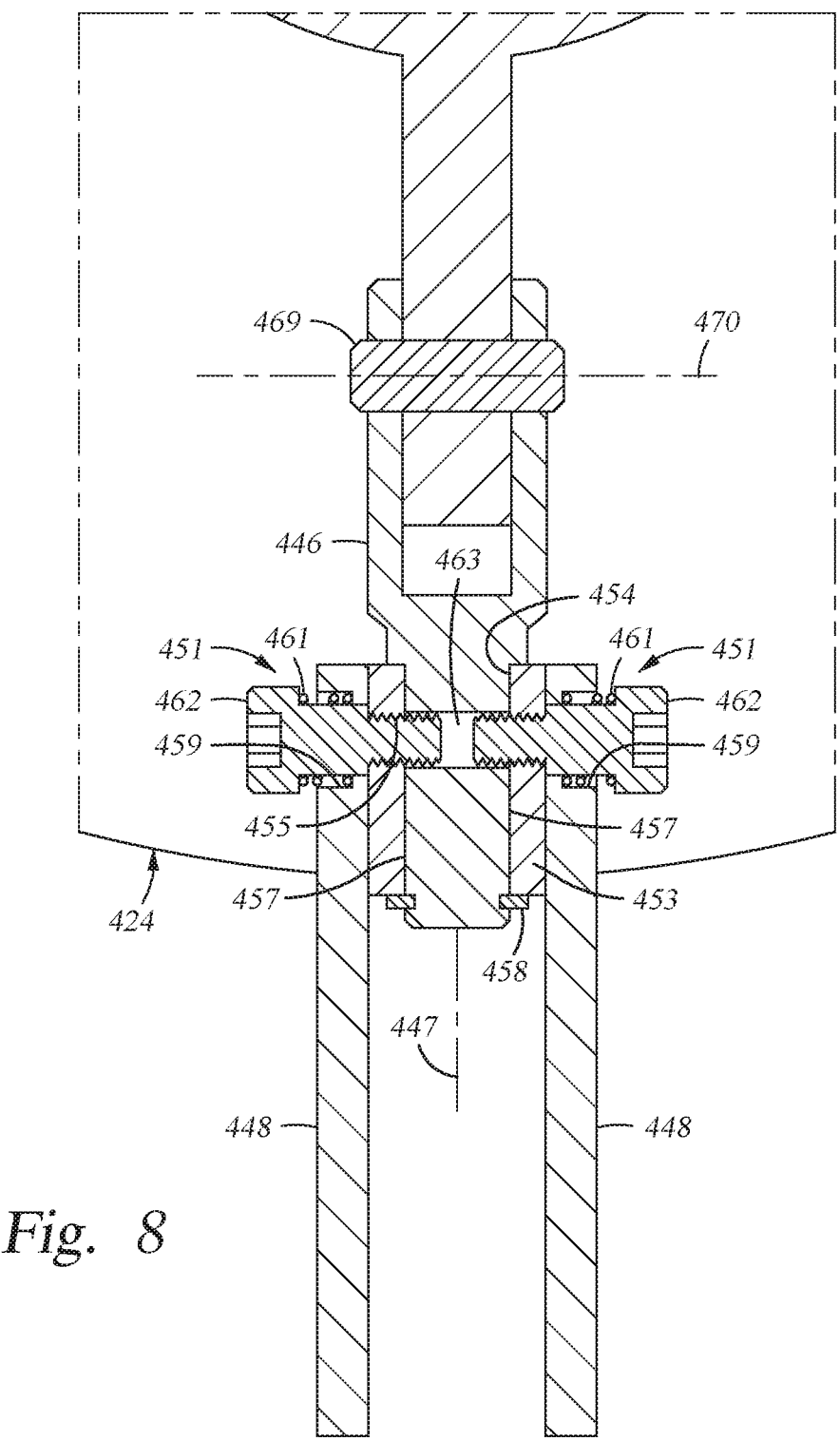
FIG. 8 is a cross-sectional view taken along line 7-7 in FIG. 7, according to one or more aspects.

With reference to, for example, FIGS. 4 and 6, the surface-processing device 412 has a trailing orientation relative to the additive-manufacturing head 408 as the head 408 moves relative to the product 404 being formed. The means 426 rotatably positions the housing 424 relative to the additive-manufacturing head 408 so that the surface-processing device 412 is in the trailing orientation relative to the additive-manufacturing head 408. The surface-processing device 412 processes the product in-situ as the product is being formed by the additive-manufacturing head 408.

Figure 9:
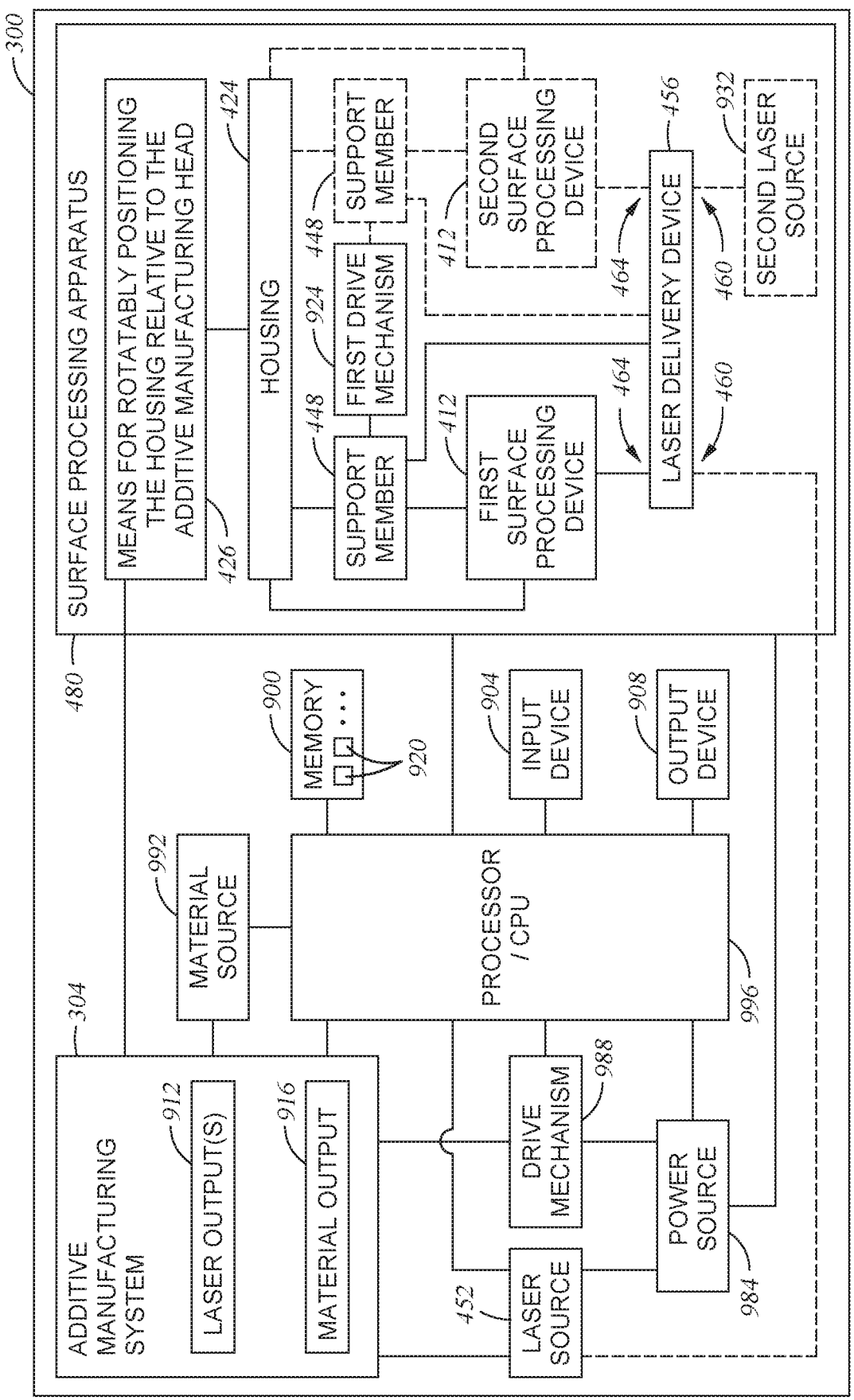
FIG. 9 is one example of a block diagram of the additive-manufacturing system shown in FIG. 4, according to one or more aspects.
Figure 10:
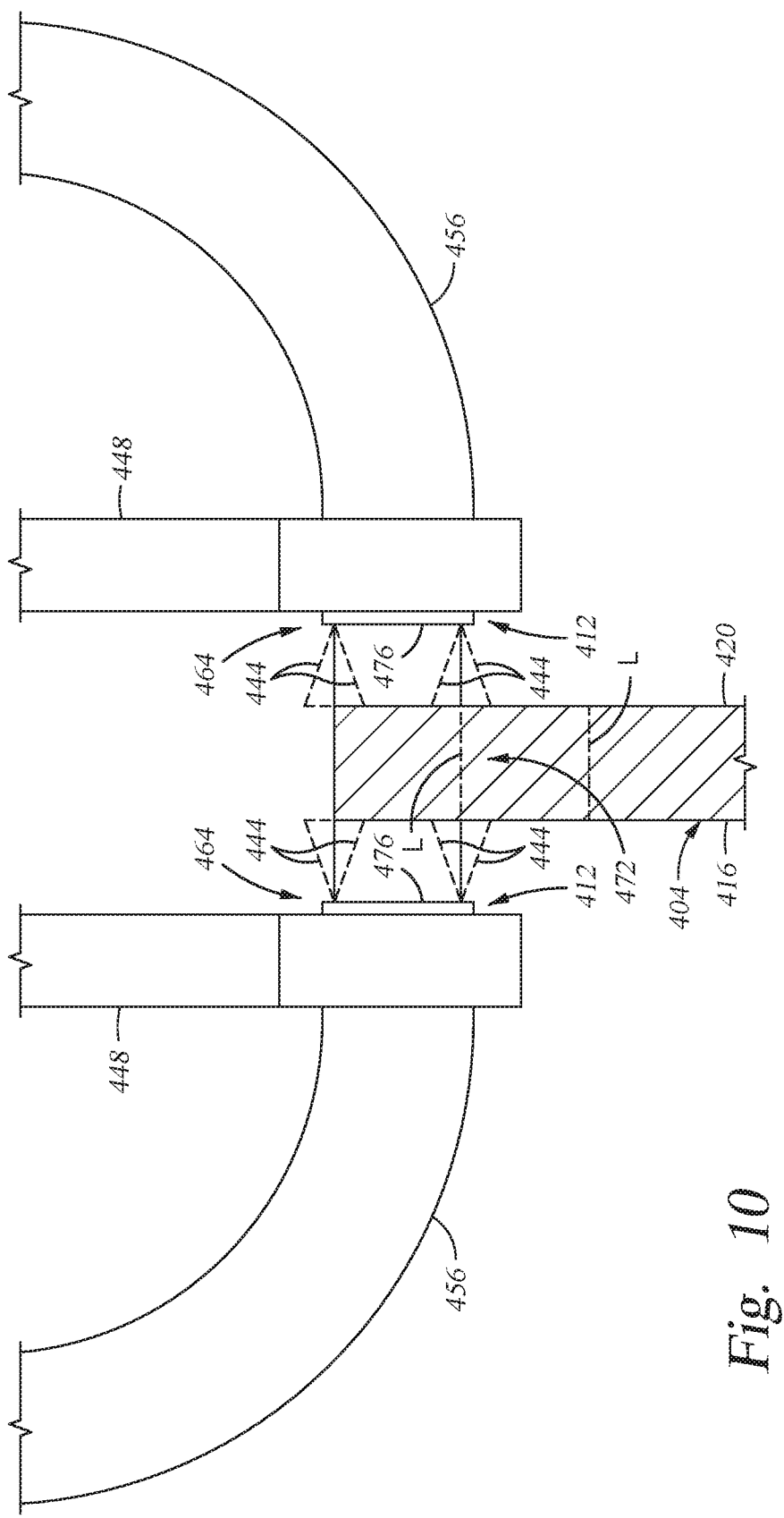
FIG. 10 is an enlarged view of one example of a pair of surface-processing devices configured to process surfaces of a product, according to one or more aspects.

In the system 400 illustrated in FIGS. 4-12, the surface-processing device 412 is a laser-emitting device 412 configured to emit a laser beam 444 (FIG. 10). The system 400, illustrated, e.g., in FIG. 4, further includes support members 448, a laser energy source 452 (FIG. 9), and laser-delivery devices 456, including first ends 460, optically coupled to the laser energy source 452, and second ends 464, coupled to the support members 448. According to one aspect of the disclosure, the laser-emitting device 450 may be the second end 464 of the laser-delivery device 456. In one example, the second end 464 of the laser-delivery device 456 is configured to be generally polygonal in shape to emit the laser beam 444 having a generally polygonal cross-section.

In one example, the second end 464 of the laser-delivery device 456 is coupled to the laser-emitting device 450 that is polygonal in shape to emit the laser beam 444, having a generally polygonal cross-section. In one variant, the laser-emitting device 450 may be rectangular in shape to emit the laser beam 444, having a generally rectangular cross-section. Rectangular shapes include square shapes. In some aspects of the system 400, for example, when the laser-emitting device 450 is rectangular in shape, the laser beam 444 applies a constant quantity of energy to a surface of a product along the entire dimension H (see, for example, FIGS. 11 and 12) of the laser beam 444, as the laser beam impinges the surface being processed. The above-described configuration of the laser beam ensures that the surface of the product being impinged by the laser beam is evenly processed along the entire dimension H of the laser beam (e.g., evenly smoothed). Some examples of shapes of laser beams 444 that enable even processing of the product surface along the entire dimension H of the laser beam impinging the surface being processed include, but are not limited to, square, rectangular, or any other shape having an equal dimension W along its entire dimension H.

Figure 11:
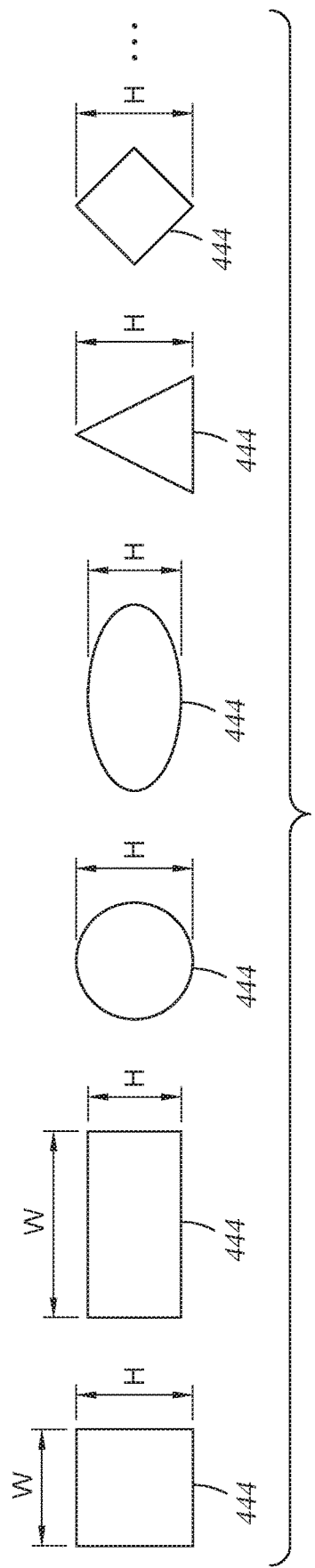
FIG. 11 illustrates examples of a plurality of shapes that the laser beam may comprise, according to one or more aspects.

With reference to, for example, FIG. 11, in other examples of the system, the laser-emitting device 450 is configured to emit the laser beam 444 having a generally arcuately perimetered shape. In further examples of the system, the laser-emitting device 450 is configured to emit the laser beam 444 having a generally circular shape. When the system is configured to emit the laser beam 444 having a generally arcuately perimetered shape, such an arcuately perimetered shape may be any shape having an at least partially arcuate perimeter. Some examples of arcuately perimetered shapes include, but are not limited to, a circle, a semi-circle, a hemi-circle, an oval, or a non-uniform shape. It should be understood that the laser-emitting device 450 is capable of emitting laser beams 444 having any shape (see FIG. 11).

Referring, e.g., to FIG. 9, the laser-delivery device 456 is optically coupled to the laser source 452 and the laser-emitting device 450. In the system illustrated in FIGS. 4-10, the laser-delivery device 456 may be a fiber optic cable 456. As shown, e.g., in FIG. 4, the system 304 includes two laser-delivery devices 456. The additive manufacturing system 304 may include any number of laser-delivery devices 456 to communicate the laser beam(s) 444 from the laser energy source 452 to the laser-emitting devices 450. In other examples, the laser-delivery device 456 may be other devices configured to optically communicate the laser beam 444 from the laser source 452 to a surface of the product formed by the additive-manufacturing head 408. Some examples include, but are not limited to, mirrors, other light and energy reflective members, light guides, etc. The laser-emitting device 450 is configured to be spaced-apart from a surface of the product formed by the additive-manufacturing head 408. The additive-manufacturing system 304 further includes a guide member 468 configured to engage a product formed by the additive-manufacturing head 408 to orient the surface-processing device 412 relative to the product. The guide member 468 spaces the surface-processing device 412 a distance away from the surface of the product. In the illustrated system 304, the guide member 468 is a guide roller 468. Although the wheels of the guide member 468 are shown to engage a surface 420 that is perpendicular to the processed surface 416, it is to be understood that the wheels could be disposed such that the wheels engage a processed surface, such as processed surface 416, e.g., if the additive manufacturing system 304 is moved in a raster during use. The wheels may also be ball in socket joints to provide facile manuvering of additive manufacturing system 304 during a raster process. In other examples of systems, the guide member 468 may be other types of guide members such as, for example, a surface-tracking shoe that engages and slides against the surface of the product, or any other type of guide member.

Figure 12:
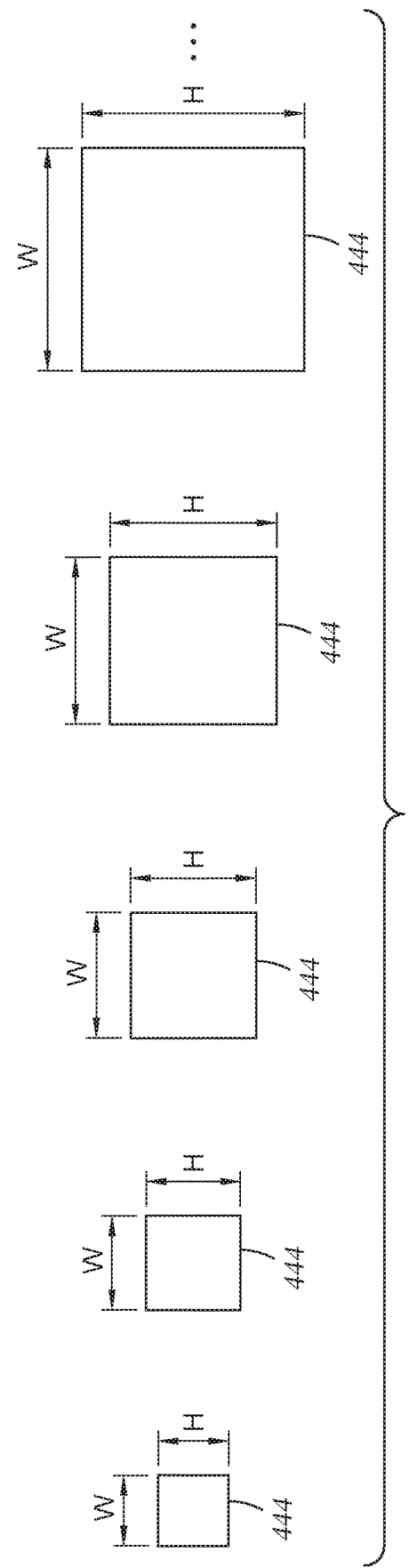
FIG. 12 illustrates a plurality of laser beams having a variety of different sizes, according to one or more aspects.

The additive-manufacturing head 408 is configured to form a product from a plurality of layers L (see, for example, FIGS. 4 and 10). The surface-processing device 412 is configured to process the product formed by the additive-manufacturing head 408 in a variety of ways. In one aspect, the surface-processing device 412 is configured to process one of the plurality of layers L (see, for example, FIG. 10). In another aspect, the surface-processing device 412 is configured to contemporaneously process two or more of the plurality of layers L. The surface-processing device 412 may be configured to contemporaneously process a number of layers L. With reference to FIG. 12, various sizes of rect-angular-shaped cross-sections of the laser beam 444 are shown to illustrate the ability to process a number of the layers L of a product formed by an additive-manufacturing head 408. The laser beam 444 of any shape may have a variety of different sizes to process various numbers of layers of a product.

As indicated above, the surface-processing device 412 is configured to move relative to the additive-manufacturing head 408. With reference to FIG. 6, the surface-processing device 412 is configured to move relative to the additive-manufacturing head 408 between a first (or active) position, in which the surface-processing device 412 is capable of processing the product formed by the additive-manufacturing head 408, and a second (or idle) position, in which the surface-processing device 412 is not capable of processing the product. In the illustrated system 400, the surface-processing device 412 is rotatably coupled to the housing 424 and the surface-processing device 412 rotates between the first position and the second position. With continued reference to FIG. 6 and additional reference to FIGS. 4, 5, 7, and 8, the system 400 includes a shaft 469, having a virtual longitudinal central axis 470. The surface-processing device 412 is configured to rotate about the shaft 469 and the associated longitudinal central axis 470 between the first position and the second position. Alternatively, the surface-processing device 412 may be coupled to the additive-manufacturing head 408 using any number of different methodologies and may move between the first position and the second position in a variety of different ways.

With continued reference to FIGS. 4-8, the additive manufacturing system 304 also includes a coupling member 446 and a support member 448. The coupling member 446 is coupled to and between the housing 424 and the support member 448, and the support member 448 supports the surface-processing device 412. The support member 448 is configured to rotate relative to the coupling member 446 about a virtual longitudinal central axis 447 (FIG. 7) of the coupling member 446. The additive manufacturing system 304 further includes a base 453 defining a first aperture 454 for receiving the coupling member 446, a second aperture 455 generally orthogonal to the first aperture 454, and a pair of recesses or channels 457 defined in opposing surfaces of the base for receiving respective support members 448. A snap ring 458 couples the base 453 to the coupling member 446. Ends of the support members 448 include counter-bored apertures 459 therein. The additive manufacturing system 304 also includes means 451 for adjusting forces applied to surfaces of a product by the guide members 468. The guide members 468 are preloaded against the surfaces of the product to maintain constant spacing of the surface-processing devices 412 relative to the surfaces of the product. In one example, the means 451 for adjusting preload include biasing members 461, such as coil springs, positioned within the counter-bored apertures 459 and fasteners 462 extending through the biasing members 461 and the counter-bored apertures 459. The fasteners 462 thread into the second aperture 455 of the base 453. The coupling member 446 defines an opening or slots 463 therein to allow rotation of the base 453 relative to the coupling member 446 about the axis 447. Thus, the base 453, the biasing members 461, the fasteners 462, the support members 448, and the surface-processing devices 412 rotate as a unit relative to the coupling member 446 about the axis 447. Fasteners 462 can be tightened or loosened to adjust the force on the guide members 468 and their preload against the surfaces 416, 420 of the product 404 by compressing the springs 461 or by allowing the springs to relax, respectively. The opening or slots 463 may be defined a portion of the way through the coupling member 446 or may be defined all the way through the coupling member 446. Defining the opening or slots 463 either partially through or completely through the coupling member 446 may provide clearance between the fasteners 462 and the coupling member 446 and facilitate rotation of the fasteners 462 relative to the coupling member 446.

In one aspect, the surface-processing device 412 is configured to rotate about at least one axis. The at least one axis may be any one or more of the axes 428, 447, 470 (see FIGS. 6-8). In another aspect, the surface-processing device 412 is configured to rotate about at least two axes. The at least two axes may be any two or more of the axes 428, 447, 470 (see FIGS. 6-8). In a further aspect, the surface-processing device 412 is configured to rotate about three axes. The three axis include all three axes 428, 447, 470 (see FIGS. 6-8).

Referring now to FIGS. 4-10, the additive manufacturing system 304 is configured to include multiple surface-processing devices 412, as indicated above. In one aspect of the system 304, the surface-processing device 412 comprises a first surface-processing device 412 and a second surface-processing device 412, spaced-apart from the first surface-processing device 412. As shown, e.g., in FIG. 5, a space 472 is provided between the first and second surface-processing devices 412. The first surface-processing device 412 and the second surface-processing device 412 are in a trailing orientation relative to the additive-manufacturing head 408. Thus, a portion of the product 404 (e.g., FIG. 10) formed by the additive-manufacturing head 408 is positioned in the space 472 between the first and second surface-processing devices 412. In one aspect, the portion of the product positioned in the space 472 is at least one layer L of the product 404. In another aspect, the portion of the product positioned in the space 472 is at least two layers L of the product contemporaneously. In a further aspect, the portion of the product positioned in the space 472 is a plurality of layers L of the product, contemporaneously.

With continued reference to FIGS. 4-10, the additive manufacturing system 304 includes a guide member 468, as indicated above. The guide member 468 may be a first guide member 468 and the additive manufacturing system 304 may further include a second guide member 468 opposing the first guide member 468. The first guide member 468 and the second guide member 468 are configured to engage a product formed by the additive-manufacturing head 408 to provide spacing of the first surface-processing device 412 and the second surface-processing device 412 relative to the product. The first guide member 468 is configured to engage an exterior surface 420 of the product 404 and the second guide member 468 is configured to engage an interior surface 416 of the product 404. In the illustrated system 400, the first guide member 468 and the second guide member 468 are guide rollers 468. In other examples, the first and second guide members 468 may be any type of guide members such as, for example, surface tracking shoes that engage and slide against surface of the product. The first surface-processing device 412 is configured to process a first surface of a product formed by the additive-manufacturing head 408 and the second surface-processing device 412 is configured to process a second surface of the product. The first surface is an exterior surface 420 of the product and the second surface is an interior surface 416 of the product.

The surface-processing devices 412 may be a variety of different types of processing devices 412. In examples where the additive manufacturing system 304 includes a single surface-processing device 412, the surface-processing device 412 includes an aperture 476 configured to emit electromagnetic energy (see FIGS. 5, 7, and 10). In examples where the additive manufacturing system 304 includes two or more surface-processing devices 412, the aperture is a first aperture 476, and the surface-processing device 412 further includes a second aperture 476 opposing the first aperture 476 and configured to emit electromagnetic energy (see FIGS. 4, 6, and 9). In one example, the first and second apertures 476 may have generally the same shape. In another example, the first aperture may have a first shape and the second aperture may have a second shape different than the first shape. In one aspect, the first aperture 476 may be the second end 464 of a first laser-delivery device 456 and the second aperture 476 may be the second end 464 of a second laser-delivery device 456.

With continued reference to FIGS. 4-12 and particular reference to FIG. 9, an example of a block diagram of the additive manufacturing apparatus 300 (of FIG. 3) is illustrated. The additive-manufacturing apparatus 300 includes the additive-manufacturing system 304, a surface-processing apparatus 480, a power source 984, a laser source 452, a drive mechanism 988, a material source 992, a processor and/or central processing unit (CPU) 996, memory 900, input device 904, and an output device 908. The apparatus 300 is not limited to including only the above-identified components, arranged as shown in FIG. 9 and having the features and functionality described herein. Rather, the apparatus 300 is capable of including more, fewer, or different components and is capable of having more, fewer, or different features and functionality, and all of such possibilities are intended to be within the spirit and scope of the present disclosure.

With continued reference to FIG. 9, the power source 984 is configured to provide power to the components of the apparatus 300, as required. The power source 984 may be a single power source or may be comprised of a plurality of power sources working together to provide the necessary power output. Alternatively, the plurality of power sources may operate independently and may individually supply power to particular components of the apparatus 300. The power source 984 may be either an AC or a DC power source, or may utilize a combination of AC and DC.

The laser source 452 generates the laser beam 944 and transmits it to one or more laser outputs 912 (e.g., FIG. 6) of the additive-manufacturing system 304 for emission. The laser beam 944, emitted from the one or more laser outputs 912, is concentrated into a nexus or convergence. The material source 992 supplies raw material to the additive-manufacturing system 304 that will be used to manufacture the product 404. The raw material may be any type of material having any type of form (e.g., powder, liquid, solid, etc.). The material is ejected from one or more material outputs 916 provided in the additive-manufacturing system 304. The material outputs 916 may comprise a variety of configurations such as, for example, apertures, nozzles, etc. In the illustrated example, the additive-manufacturing system 304 includes a single material output 490 (916 of FIG. 9), which is comprised of an aperture 490 (916 of FIG. 9) aligned with the nexus or convergence of the plurality of laser outputs 912. Raw material is released from the material output 916 and enters the nexus or convergence of the laser outputs 912, where the material is melted to form a weld pool. As the additive-manufacturing system 304 advances relative to the product being formed, the melted material forms a new layer L of the product 404. The melted material begins to cool and harden once the material is out of the weld pool.

With additional reference to FIG. 9, the processor or CPU 496 communicates with and/or controls various components in the apparatus 300. The memory 900 may be a computer-readable memory medium 900 and is configured to store data required for operation of the additive manufacturing system 304. Computer-readable memory medium 900 is any medium which can be used to store information which can later be accessed by the processor 996. Computer-readable memory medium 900 may include computer memory and data storage devices. Computer memory may be a fast-access memory and may be used to run program instructions executable by the processor 996. Computer memory may include random access memory (RAM), flash memory, and read-only memory (ROM). Data storage devices may be physical devices and may be used to store any information or computer program which may be accessed by the processor 996, such as an operating system, computer programs, program modules, and program data. Data storage devices and their associated computer-readable memory media provide storage of computer-readable instructions, data structures, program modules, and other data for the system. Data storage devices may include magnetic medium like a floppy disk, a hard disk drive, and magnetic tape; an optical medium like a Compact Disc (CD), a Digital Video Disk (DVD), and a Blu-ray Disc; and solid state memory such as random access memory (RAM), flash memory, and read only memory (ROM).

In some aspects of the apparatus 300, the memory 900 includes data packets 920 comprised of data required for controlled operation of the additive manufacturing system 304. One data packet 920 may contain data required for control of the additive-manufacturing head 908 and another data packet 920 may contain data required for control of the surface-processing apparatus 480. The surface-processing apparatus 480 is coupled to and in a trailing orientation to the additive-manufacturing system 304. The surface-processing apparatus 480 processes one or more surfaces of the product after the material has been deposited by the additive-manufacturing system 304. The processor 996 communicates with the memory 900 to retrieve the necessary data for controlling the orientation of the surface-processing apparatus 480 relative to the additive-manufacturing system 304.

The subject matter of the present disclosure will be described with reference to acts and symbolic representations of operations that are performed by one or more computers or computer systems, unless indicated otherwise. As such, it will be understood that such acts and operations, which are at times referred to as being computer-executed, include the manipulation by the processor 996 of the apparatus 300 via electrical signals representing data in a structured form. This manipulation transforms the data or maintains it at specific locations in the memory 900 of the apparatus 300, which reconfigures or otherwise alters the operation of the apparatus 300 in a manner well understood by those skilled in the art. The data structures where data is maintained are physical locations of the memory that have particular properties defined by the format of the data. However, although the subject matter of the application is being described in the foregoing context, it is not meant to be limiting, as those skilled in the art will appreciate, in that some of the acts and operations described herein may also be implemented in hardware, software, and/or firmware and/or some combination thereof.

With further reference to FIG. 9, the input device 904 allows users to input data into the apparatus 300. The input device 904 may have a wide variety of configurations, all of which are intended to be within the spirit and scope of the present disclosure. For example, the input device 904 may be a keyboard, a keypad, a touch-screen display, an actuator, a switch, a dial, a slide mechanism, or any other type of mechanical, electrical, or electromechanical device configured to allow a user to input information and/or control the apparatus 300, at least in part. Moreover, the apparatus 300 may include a plurality of input devices 904.

With continued reference to FIG. 9, the output device 908 outputs information from the apparatus 300 that may be perceived by a user. The output device 908 may have a wide variety of configurations, all of which are intended to be within the spirit and scope of the present disclosure. For example, the output device 908 may be display, a monitor, an alphanumeric indicator, an illumination device (e.g., a light bulb, an LED, an array of LEDs, etc.), a printer or other image-producing device, or any other type of mechanical, electrical, or electromechanical device configured to output information from the apparatus 300 in a form that is perceivable by a user. Moreover, the apparatus 300 may include a plurality of output devices 908.

The drive mechanism 988 is coupled to the additive-manufacturing system 304 and is controllable by the processor 996 to move the additive-manufacturing system 304 in a desired manner. Alternatively, the additive-manufacturing system 304 may remain stationary and the product manufactured by the apparatus 300 may be supported on a base or table that may be moved by the drive mechanism 988 relative to the additive manufacturing system 304. In either instance, the drive mechanism 988 provides the desired relative translational movement between the product 904 being formed and the additive-manufacturing apparatus 300. In some aspects of the apparatus 300, the drive mechanism 988 comprises a single drive mechanism for performing all the necessary relative translational movement. In other aspects of the apparatus 300, the drive mechanism 988 comprises a plurality of cooperating drive mechanisms.

The surface-processing apparatus 480 is configured to process one or more surfaces of a product formed by the additive-manufacturing system 304. The surface-processing apparatus 480 trails behind the additive-manufacturing system 304 to process the material deposited by the additive-manufacturing system 304. The surface-processing apparatus 480 may process the surfaces of the product being formed in a variety of ways. For example, in the illustrated apparatus 300, the surface-processing apparatus 480 may smooth or otherwise reduce the roughness of the surfaces of the product. This example of surface processing is not intended to be limiting upon the present disclosure. Rather, the apparatus 300 is capable of performing any type of surface-processing, such as, for example, coating or heat treating, and all of such possibilities are intended to be within the spirit and scope of the present disclosure. The surface-processing apparatus 480 may treat a portion of the product 404 as the product is being formed, operating in situ. In some aspects of the disclosure, the surface-processing apparatus 480 may process a single layer L of material deposited by the additive-manufacturing system 304. In other aspects, the surface-processing apparatus 480 may process two or more layers L of material deposited by the additive-manufacturing system 304. The surface-processing apparatus 480 may also be configured to treat a plurality of layers L of the product formed by the additive-manufacturing system 304.

Referring now to FIGS. 4-12, in the illustrated apparatus 300, the surface-processing apparatus 480 includes a first surface-processing device 412 and a second processing device 412. The first and second processing devices 412 may include a wide variety of types of processing devices and, as a result, may process the surfaces of the product formed by the additive-manufacturing system 304 in a variety of ways. In the illustrated apparatus 300, the first and second surface-processing devices 412 are laser-emitting devices. The surface-processing apparatus 480 also includes a first drive mechanism configured to move the first and second surface-processing devices 412 between a first or active position, in which the first and second surface processing devices 412 are configured to process the surfaces of the product formed by the additive-manufacturing system 304 (see, for example, solid lines FIG. 6), and a second or idle position, in which the first and second surface-processing devices 412 are not configured to process the surfaces of the product (as illustrated, for example, with the dashed lines in FIG. 6). In one example, the first drive mechanism is a servo-motor or a stepper-motor. In another example, the first drive mechanism may be air driven (e.g., rotary, linear, etc.), hydraulically driven (e.g., rotary, linear, etc.), or electromagnetically driven (e.g., solenoid).

In some aspects of the disclosure, the apparatus 300 may comprise only a single surface-processing device 412 to process a single surface of the product formed by the additive-manufacturing system 304. Thus, the second surface-processing device 412 is shown in dashed lines in FIG. 9 to illustrate an alternative aspect of the present disclosure.

Referring, for example, to FIG. 9, the surface-processing apparatus 480 further includes the means 426 for rotatably positioning the housing 424 of the surface-processing apparatus 480 relative to the additive-manufacturing system 304. In some aspects, the means 426 may be an open-frame servo motor coupled to the additive-manufacturing system 304. In other aspects, the means 426 may be other types of drive mechanisms and may have other configurations.

The surface-processing device 412 may also include a second laser source 932 configured to create a laser beam 444 to be optically communicated to the first and second surface-processing devices 412. In this example, the second laser source 932 would provide the laser beam 444 for the surface-processing operation and the laser source 452 would provide the laser beam 444 for the additive-manufacturing system 304.

As shown in FIG. 9, the lines connecting the various components of the apparatus 300 may represent a wide variety of interactions between the various components of the apparatus 300. Moreover, such interactions between the components may occur in either direction or may simultaneously occur in both directions. The interactions may include, but are not limited to, transfer of electrical energy or power for purposes of powering a component, communication of electrical data between components, transfer of physical matter between components, a mechanical coupling, connection, attachment, or engagement between components, or any other type of interaction that may occur in the additive-manufacturing apparatus 300, in one or more aspects thereof. The dashed lines connecting the various components of the apparatus 300 may represent interactions similar in function and purpose to those represented by the solid lines, however, interactions represented by the dashed lines relate to alternative aspects of the disclosure. Likewise, components represented in dashed lines represent alternative aspects of the present disclosure.

With reference to, for example, FIGS. 4 and 9, in one example, a surface-processing apparatus 480 for an additive-manufacturing system 304 is provided. The surface-processing apparatus 480 includes a housing, 424 configured to be coupled to the additive-manufacturing system 304, and a surface-processing device 412, coupled to the housing 424. The surface-processing device 412 includes one of a mechanical device or an optical device. The surface-processing device 412 is configured to move relative to the additive-manufacturing system 304. In one aspect, the housing 424 is rotatably coupled to the additive-manufacturing system 304. In such an aspect, the surface-processing apparatus 480 further includes means 426 for rotatably positioning the housing 424 relative to the additive-manufacturing head 408.

As shown, for example, in FIGS. 4 and 6, the surface-processing device 412 has a trailing orientation relative to the additive-manufacturing system 304. The surface-processing device 212 is configured to be spaced apart from a surface of a product 404 formed by the additive-manufacturing system 304.

Referring now to FIGS. 4-10, in one aspect, the surface-processing device 412 is configured to emit a laser beam 444. The surface-processing apparatus 480 further includes a laser energy source 452, 932 and a laser-delivery device 456 coupled to the laser energy source 452, 932 to deliver the laser beam 444 from the laser energy source 452, 932 to a surface of a product formed by the additive-manufacturing system 304. The surface-processing device 412 also includes a support member 448 coupled to the housing 424, and the laser-delivery device 456 includes a first end 460 coupled to the laser energy source 452, 932 and a second end 464 coupled to the support member 448. In one aspect, the second end 464 of the laser-delivery device 456 is generally polygonal in shape to emit the laser beam 444 having a generally polygonal cross-section. In another aspect, the second end 464 of the laser-delivery device 456 is generally rectangular in shape to emit the laser beam 444 having a generally rectangular cross-section. In a further aspect, the laser-delivery device 456 is configured to emit the laser beam 444 having a cross-section with a generally arcuate perimeter. In one aspect, the laser-delivery device is a fiber optic cable 456.

The surface-processing device 412 is configured to engage a product formed by the additive-manufacturing system 304. In one aspect, the surface-processing device 412 is configured to optically engage a product formed by the additive-manufacturing system 304.

In one aspect, the additive-manufacturing system 304 is configured to form a product from a plurality of layers L (see FIG. 4), and the surface-processing device 412 is configured to process at least one of the plurality of layers L (see FIGS. 4 and 10). In another aspect, the additive-manufacturing system 304 is configured to form a product from a plurality of layers L, and the surface-processing device 412 is configured to contemporaneously process two or more of the plurality of layers L.

The surface-processing device 412 is configured to move relative to the additive-manufacturing system 304 between the first (active) position, in which the surface-processing device 412 is capable of processing a product formed by the additive-manufacturing system 304 (see, for example, solid lines in FIG. 6), and the second (idle) position, in which the surface-processing device 412 is not capable of processing the product (see, for example, dashed lines in FIG. 6). In one aspect, the surface-processing device 412 is rotatably coupled to the housing 424 and rotates between the first position and the second position. The surface-processing apparatus 480 also includes the coupling member 446 and the support member 448. The coupling member 446 is coupled to and between the housing 424 and the support member 448, and the support member 448 supports the surface-processing device 412. In one aspect, the support member 448 is configured to rotate relative to the coupling member 446. The support member 448 is configured to rotate about the longitudinal central axis of the coupling member 446.

In some examples, the apparatus 300 includes multiple surface-processing devices 412. In such aspects, the first surface-processing device 412 and the second surface-processing device 412 are spaced-apart from the first surface-processing device 412. Both the first and second surface-processing devices 412 are in a trailing orientation relative to the additive-manufacturing system 304. The first surface-processing device 412 is configured to process a first surface of the product formed by the additive-manufacturing system 304 and the second surface-processing device 412 is configured to process the second surface of the product. In one aspect, the first surface is an exterior surface 420 of the product 404 and the second surface is an interior surface 416 of the product 404.

The surface-processing apparatus 480 further includes the guide member 468. The guide member 468 is configured to engage a product formed by the additive-manufacturing system 304 and is configured to orient the surface-processing device 412 relative to the product. The guide member 468 is configured to space the surface-processing device 412 a distance away from the surface of the product. In one aspect, the guide member 468 is a guide roller. In one aspect, the surface-processing device 412 is an optical device. The surface-processing device 412 is configured to smooth a surface of a product formed by the additive-manufacturing system 304. In one aspect, the surface-processing device 412 is configured to rotate about at least one axis 428, 447, 470. In another aspect, the surface-processing device 212 is configured to rotate about at least two axes 428, 447, 470. In a further aspect, the surface-processing device 412 is configured to rotate about three axes 428, 447, 470. In one example of the apparatus 300, the surface-processing device 412 includes the aperture 476 configured to emit electromagnetic energy.

Aspects

The present disclosure provides, among others, the following aspects, each of which may be considered as optionally including any alternate aspects.

Clause 1. A method for powder bed additive manufacturing, comprising:
  defining a uniform pitch raster path for a laser traveling at a predetermined rate of travel, wherein the raster path alternates back and forth within a strip width of less than 0.5 mm such that the laser's power density level is at least 80 percent of maximum power and the predetermined rate of travel yields a travel speed in the scan width direction of not less than 1,000 mm/s;
  depositing a layer of powder onto a substrate; and
  causing the laser to solidify a quantity of the powder according to the defined raster path and the laser power setting.

Clause 2. The method of clause 1, wherein the raster path comprises a traverse distance of from about 0.1 mm to about 5 mm.

Clause 3. The method of clauses 1 or 2, wherein the raster path comprises a traverse distance of from about 0.5 mm to about 1 mm.

Clause 4. The method of any of clauses 1 to 3, wherein the raster path comprises a scan width distance of from about 0.08 mm to about 0.2 mm.

Clause 5. The method of any of clauses 1 to 4, wherein the raster path comprises a scan width distance of from about 0.15 mm to about 0.18 mm.

Clause 6. The method of any of clauses 1 to 5, wherein the raster path comprises a scan density of from about 5,000 laser passes per $m^2$ to about 25,000 laser passes per $m^2$.

Clause 7. The method of any of clauses 1 to 6, wherein the raster path comprises a scan density of from about 8,750 laser passes per $m^2$ to about 18,750 laser passes per $m^2$.

Clause 8. The method of any of clauses 1 to 7, wherein the raster path comprises an average hatch spacing of from about 0.04 mm to about 2 mm.

Clause 9. The method of any of clauses 1 to 8, wherein the raster path comprises an average hatch spacing of from about 0.09 mm to about 0.11 mm.

Clause 10. The method of any of clauses 1 to 9, wherein the predetermined rate of travel yields a travel speed in the scan width direction of from about 1,700 mm/s to about 2,200 mm/s.

Clause 11. The method of any of clauses 1 to 10, wherein the predetermined rate of travel yields a travel speed in the traverse direction of not less than 1,000 mm/s.

Clause 12. The method of any of clauses 1 to 11, wherein the predetermined rate of travel yields a travel speed in the traverse direction of from about 1,700 mm/s to about 2,200 mm/s.

Clause 13. The method of any of clauses 1 to 12, wherein the laser has a laser-beam average power of from about 200 W to about 1,000 W.

Clause 14. The method of any of clauses 1 to 13, wherein the laser has a laser-beam average power of from about 400 W to about 500 W.

Clause 15. The method of any of clauses 1 to 14, wherein the laser comprises a laser beam having a beam diameter of from about 0.05 mm to about 0.2 mm.

Clause 16. The method of any of clauses 1 to 15, wherein the laser comprises a laser beam having a beam diameter of from about 0.1 mm to about 0.14 mm.

Clause 17. The method of any of clauses 1 to 16, wherein the strip width is from about 0.5 mm to about 1 mm.

Clause 18. The method of any of clauses 1 to 17, wherein the laser comprises a laser beam disposed at an angle of incidence of from about 85° to about 95° relative to a laser contact surface of the substrate.

Clause 19. The method of any of clauses 1 to 18, further comprising pre-treating the powder at a laser-beam average power of from about 50 W to about 400 W.

Clause 20. The method of any of clauses 1 to 19, wherein pre-treating is performed after depositing the layer of powder onto the substrate.

Clause 21. The method of any of clauses 1 to 20, wherein the powder is selected from aluminum, aluminum alloy, titanium, titanium alloy, nickel, nickel alloy, stainless steel, alloy steel, cobalt alloy, plastic, polymer, nylon, or a combination(s) thereof.

Clause 22. The method of any of clauses 1 to 21, wherein the powder is selected from aluminum, aluminum alloy, titanium, titanium alloy, or a combination(s) thereof.

Clause 23. The method of any of clauses 1 to 22, wherein the substrate comprises aluminum, aluminum alloy, titanium, titanium alloy, nickel, nickel alloy, stainless steel, alloy steel, cobalt alloy, plastic, polymer, nylon, or a combination(s) thereof.

Clause 24. The method of any of clauses 1 to 23, wherein the substrate comprises aluminum, aluminum alloy, titanium, titanium alloy, or a combination(s) thereof.

Clause 25. A method for additive manufacturing, comprising:
depositing a layer of material onto a substrate; and
treating the material with a laser by moving the laser at a travel speed in a scan width direction not less than 1,000 mm/s in a raster path relative to the substrate, wherein:
the raster path comprises a traverse distance of from about 0.1 mm to about 5 mm,
the raster path comprises a scan width distance of from about 0.08 mm to about 0.2 mm,
the raster path comprises an average hatch spacing of from about 0.04 mm to about 2 mm,
the laser has a laser-beam average power of from about 200 W to about 1,000 W, and
the laser comprises a laser beam having a beam diameter of from about 0.05 mm to about 0.2 mm.

Clause 26. The method of clause 25, wherein the raster path comprises a traverse distance of from about 0.5 mm to about 1 mm.

Clause 27. The method of clauses 25 or 26, wherein the raster path comprises a scan width distance of from about 1 mm to about 5 mm.

Clause 28. The method of any of clauses 25 to 27, wherein the raster path comprises a scan density of from about 5,000 laser passes per $m^2$ to about 25,000 laser passes per $m^2$.

Clause 29. The method of any of clauses 25 to 28, wherein the raster path comprises an average hatch spacing of from about 0.09 mm to about 0.11 mm.

Clause 30. The method of any of clauses 25 to 29, wherein a travel speed in the scan direction is from about 1,700 mm/s to about 2,200 mm/s.

Clause 31. The method of any of clauses 25 to 30, wherein treating the material with a laser comprises moving the laser at a travel speed in the traverse direction of from about 1,700 mm/s to about 2,200 mm/s.

Clause 32. The method of any of clauses 25 to 31, wherein the laser has a laser-beam average power of from about 400 W to about 500 W.

Clause 33. The method of any of clauses 25 to 32, wherein the laser comprises a laser beam having a beam diameter of from about 0.1 mm to about 0.14 mm.

Clause 34. The method of any of clauses 25 to 33, wherein the laser comprises a laser beam disposed at an angle of incidence of from about 85° to about 95° relative to a laser contact surface of the substrate.

Clause 35. The method of any of clauses 25 to 34, further comprising pre-treating the material at a laser-beam average power of from about 50 W to about 400 W.

Clause 36. The method of any of clauses 25 to 35, wherein pre-treating is performed after depositing the layer of material onto the substrate.

Clause 37. The method of any of clauses 25 to 36, wherein the material is selected from aluminum, aluminum alloy, titanium, titanium alloy, nickel, nickel alloy, stainless steel, alloy steel, cobalt alloy, plastic, polymer, nylon, or a combination(s) thereof.

Clause 38. The method of any of clauses 25 to 37, wherein the material is selected from aluminum, aluminum alloy, titanium, titanium alloy, or a combination(s) thereof.

Clause 39. The method of any of clauses 25 to 38, wherein the substrate comprises aluminum, aluminum alloy, titanium, titanium alloy, nickel, nickel alloy, stainless steel, alloy steel, cobalt alloy, plastic, polymer, nylon, or a combination(s) thereof.

Clause 40. The method of any of clauses 25 to 39, wherein the substrate comprises aluminum, aluminum alloy, titanium, titanium alloy, or a combination(s) thereof.

Overall, the present disclosure provides additive-manufacturing methods of, for example, high strength alloys. Methods of present disclosure can suppress residual stress cracking by modifying the solidifaction rate of the alloys during processing. For example, by changing the strip width of the laser to 1/10th of normal operating parameters, oscillations of the laser travel path within the strip are reduced in amplitude. Thus for a set speed of travel, the laser head (of the apparatus manufacturing system) moves faster along the strip. Moving faster allows for an increased laser power to be used. In addition, moving faster also allows the previous scan pass melt pool from fully cooling before the next line in the raster in scanned, creating a significantly slower solidification front which can reduce the rate of solidification shrinkage (and by extension, the strain rate imposed on liquid films at grain boundaries in the melt).

While the foregoing is directed to examples of the present disclosure, other and further examples of the present disclosure may be devised without departing from the basic scope thereof. Furthermore, while the foregoing is directed to methods as applied to vehicle components, e.g. of the aerospace industry, examples of the present disclosure may be directed to other applications not associated with an aircraft, such as applications in the automotive industry, marine industry, energy industry, wind turbines, satellites, and the like.

The descriptions of the various examples of the present disclosure have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein. While the foregoing is directed to examples of the present disclosure, other and further examples of the present disclosure may be devised without departing from the basic scope thereof.

What is claimed is:

1. A method for powder bed additive manufacturing, comprising:
producing a uniform pitch raster path for a laser traveling at a predetermined rate of travel comprising a scan width direction and a traverse direction perpendicular to the scan width direction, wherein the laser comprises a beam diameter, wherein the raster path alternates back and forth in the scan width direction forming a laser sheet having a strip width of 0.08 mm to 0.2 mm, wherein the laser has a laser-beam average power of 200 W to 1,000 W, and the predetermined rate of travel yields a travel speed in the scan width direction of not less than 1,000 mm/s, wherein the strip width is greater than the beam diameter;

depositing a layer of powder onto a substrate; and causing the laser to solidify a quantity of the powder according to the produced raster path and the laser power setting.

2. The method of claim 1, wherein the raster path comprises a traverse distance in the traverse direction of 0.1 mm to 5 mm.

3. The method of claim 2, wherein the traverse distance of the raster path is 0.5 mm to 1 mm.

4. The method of claim 1, further comprising directing the laser beam to move substantially continuously and sequentially among scan regions such that the completion of one of scan region is followed by the start of another of scan region.

5. The method of claim 1, wherein the strip width is 0.15 mm to 0.18 mm.

6. The method of claim 1, wherein the raster path comprises a scan density of 5,000 laser passes per $m^2$ to 25,000 laser passes per $m^2$.

7. The method of claim 6, wherein the scan density is 8,750 laser passes per $m^2$ to 18,750 laser passes per $m^2$.

8. The method of claim 1, wherein the raster path comprises an average hatch spacing in the traverse direction of 0.04 mm to 2 mm.

9. The method of claim 8, wherein the average hatch spacing is 0.09 mm to 0.11 mm.

10. The method of claim 1, wherein the predetermined rate of travel yields a travel speed in the scan width direction is 1,700 mm/s to 2,200 m m/s.

11. The method of claim 1, wherein the predetermined rate of travel yields a travel speed in the traverse direction of not less than 1,000 mm/s.

12. The method of claim 11, wherein the predetermined rate of travel yields a travel speed in the traverse direction is 1,700 mm/s to 2,200 m m/s.

13. The method of claim 1, wherein the laser-beam average power is 400 W to 500 W.

14. The method of claim 1, wherein the beam diameter is 0.05 mm or greater.

15. The method of claim 14, wherein the beam diameter is 0.1 mm to 0.14 mm.

16. The method of claim 1, wherein the strip width is from 0.1 mm to 0.18 mm.

17. The method of claim 1, wherein the laser beam is disposed at an angle of incidence of 85° to 95° relative to a laser contact surface of the substrate.

18. The method of claim 1, further comprising pre-treating the powder at a laser-beam average power of 50 W to 400 W.

19. The method of claim 18, wherein pre-treating is performed after depositing the layer of powder onto the substrate.

20. The method of claim 1, wherein the powder is selected from aluminum, aluminum alloy, titanium, titanium alloy, nickel, nickel alloy, stainless steel, alloy steel, cobalt alloy, plastic, polymer, nylon, or a combination(s) thereof.

21. The method of claim 20, wherein the powder is selected from aluminum, aluminum alloy, titanium, titanium alloy, or a combination(s) thereof.

22. The method of claim 20, wherein the substrate comprises aluminum, aluminum alloy, titanium, titanium alloy, nickel, nickel alloy, stainless steel, alloy steel, cobalt alloy, plastic, polymer, nylon, or a combination(s) thereof.

23. The method of claim 22, wherein the substrate comprises aluminum, aluminum alloy, titanium, titanium alloy, or a combination(s) thereof.

24. The method of claim 1, wherein the travel speed in the scan width direction is greater than a travel speed of the laser in the traverse direction.

25. The method of claim 24, wherein the travel speed in the scan width direction is greater than 1,000 times the travel speed of the laser in the traverse direction.

26. A method for additive manufacturing, comprising:

depositing a layer of material onto a substrate; and treating the material with a laser by moving the laser at a travel speed in a scan width direction of not less than 1,000 mm/s in a raster path relative to the substrate, the laser having a laser-beam average power of 200 W to 1,000 W and a laser beam having a beam diameter of 0.05 or greater, wherein moving the laser in the scan width direction forms a laser sheet having a strip width of 0.08 mm to 0.2 mm, wherein the strip width is greater than the beam diameter, wherein:

the raster path comprises a traverse distance along a traverse direction perpendicular to the scan width direction of 0.1 mm to 5 mm, and the raster path comprises an average hatch spacing along the traverse direction between the strip width and a next strip width of 0.04 mm to 2 mm.

27. The method of claim 26, wherein the traverse distance is 0.5 mm to 1 mm.

28. The method of claim 26, wherein the strip width is 0.15 mm to 0.18 mm.

29. The method of claim 26, wherein the raster path comprises a scan density of 5,000 laser passes per $m^2$ to 25,000 laser passes per $m^2$.

30. The method of claim 26, wherein the average hatch spacing is 0.09 mm to 0.11 mm.

31. The method of claim 26, wherein a travel speed in the scan width direction is from 1,700 mm/s to 2,200 mm/s.

32. The method of claim 26, wherein treating the material with a laser comprises moving the laser at a travel speed in the traverse direction of 1,700 mm/s to 2,200 mm/s.

33. The method of claim 26, wherein the laser-beam average power of the laser is 400 W to 500 W.

34. The method of claim 26, wherein the beam diameter is 0.1 mm to 0.14 mm.

35. The method of claim 26, wherein the laser beam is disposed at an angle of incidence of 85° to 95° relative to a laser contact surface of the substrate.

36. The method of claim 26, further comprising pre-treating the material at a laser-beam average power of 50 W to 400 W.

37. The method of claim 36, wherein pre-treating is performed after depositing the layer of material onto the substrate.

38. The method of claim 26, wherein the material is selected from aluminum, aluminum alloy, titanium, titanium alloy, nickel, nickel alloy, stainless steel, alloy steel, cobalt alloy, plastic, polymer, nylon, or a combination(s) thereof.

39. The method of claim 38, wherein the material is selected from aluminum, aluminum alloy, titanium, titanium alloy, or a combination(s) thereof.

* * * * *

UNITED STATES PATENT AND TRADEMARK OFFICE
CERTIFICATE OF CORRECTION

| | |
|---|---|
| PATENT NO. | : 11,691,218 B2 |
| APPLICATION NO. | : 16/364818 |
| DATED | : July 4, 2023 |
| INVENTOR(S) | : Paul Nathaniel Wilson et al. |

It is certified that error appears in the above-identified patent and that said Letters Patent is hereby corrected as shown below:

On the Title Page

In item (74), in Column 2, in "Attorney, Agent, or Firm", Line 1, delete "Sherdan," and insert -- Sheridan, --.

In the Claims

In Column 26, Line 66, in Claim 1, delete "laser-beam" and insert -- laser beam --.

In Column 27, Line 31, in Claim 10, delete "m m/s." and insert -- mm/s. --.

In Column 27, Line 37, in Claim 12, delete "m m/s." and insert -- mm/s. --.

In Column 27, Line 38, in Claim 13, delete "laser-beam" and insert -- laser beam --.

In Column 27, Line 50, in Claim 18, delete "laser-beam" and insert -- laser beam --.

In Column 28, Line 17, in Claim 26, delete "laser-beam" and insert -- laser beam --.

In Column 28, Line 43, in Claim 33, delete "laser-beam" and insert -- laser beam --.

In Column 28, Line 51, in Claim 36, delete "laser-beam" and insert -- laser beam --.

Signed and Sealed this
Twenty-eighth Day of November, 2023

Katherine Kelly Vidal
*Director of the United States Patent and Trademark Office*